United States Patent
Butrie et al.

(10) Patent No.: US 10,211,925 B2
(45) Date of Patent: Feb. 19, 2019

(54) HYBRID OPTICAL TRANSMITTER AND/OR RECEIVER STRUCTURE

(71) Applicant: Infinera Corporation, Sunnyvale, CA (US)

(72) Inventors: Timothy Butrie, Hellertown, PA (US); Michael Reffle, Center Valley, PA (US); Xiaofeng Han, Allentown, PA (US); Mehrdad Ziari, Pleasanton, CA (US); Vikrant Lal, Sunnyvale, CA (US); Peter W. Evans, Mountain House, CA (US); Fred A. Kish, Jr., Palo Alto, CA (US); Donald J. Pavinski, West Pittston, PA (US); Jie Tang, Fogelsville, PA (US); David Coult, Oley, PA (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 15/849,390

(22) Filed: Dec. 20, 2017

(65) Prior Publication Data

US 2018/0138981 A1    May 17, 2018

Related U.S. Application Data

(62) Division of application No. 14/699,907, filed on Apr. 29, 2015, now Pat. No. 9,876,575.

(Continued)

(51) Int. Cl.
*G02B 6/35* (2006.01)
*G02B 6/36* (2006.01)
(Continued)

(52) U.S. Cl.
CPC .......... *H04B 10/40* (2013.01); *G02B 6/4204* (2013.01); *H04B 10/503* (2013.01); *H04J 14/06* (2013.01);
(Continued)

(58) Field of Classification Search
None
See application file for complete search history.

(56) References Cited

U.S. PATENT DOCUMENTS

| 2,162,010 A * | 6/1939 | Graham | G01M 11/061 |
| | | | 356/121 |
| 2003/0210874 A1* | 11/2003 | Souda | G02B 6/29361 |
| | | | 385/89 |

(Continued)

*Primary Examiner* — Darren E Wolf
(74) *Attorney, Agent, or Firm* — David L. Soltz

(57) ABSTRACT

A device may include a substrate. The device may include a carrier mounted to the substrate. The device may include a transmitter photonic integrated circuit (PIC) mounted on the carrier. The transmitter PIC may include a plurality of lasers that generate an optical signal when a voltage or current is applied to one of the plurality of lasers. The device may include a first microelectromechanical structure (MEMS) mounted to the substrate. The first MEMS may include a first set of lenses. The device may include a planar lightwave circuit (PLC) mounted to the substrate. The PLC may be optically coupled to the plurality of lasers by the first set of lenses of the first MEMS. The device may include a second MEMS, mounted to the substrate, that may include a second set of lenses, which may be configured to optically couple the PLC to an optical fiber.

7 Claims, 22 Drawing Sheets

Related U.S. Application Data

(60) Provisional application No. 62/012,974, filed on Jun. 16, 2014, provisional application No. 62/009,364, filed on Jun. 9, 2014, provisional application No. 61/986,624, filed on Apr. 30, 2014.

(51) Int. Cl.
    *G02B 6/42*     (2006.01)
    *H04B 10/40*     (2013.01)
    *H04B 10/50*     (2013.01)
    *H04J 14/06*     (2006.01)

(52) U.S. Cl.
    CPC .......... *G02B 6/3584* (2013.01); *G02B 6/3598* (2013.01); *G02B 6/366* (2013.01); *G02B 6/4215* (2013.01); *G02B 6/4234* (2013.01); *G02B 6/4246* (2013.01)

(56) References Cited

U.S. PATENT DOCUMENTS

| | | | | |
|---|---|---|---|---|
| 2007/0165980 A1* | 7/2007 | Jenkins | ................. | G02B 6/122 385/14 |
| 2011/0273719 A1* | 11/2011 | Froggatt | ................ | G01M 11/35 356/446 |
| 2011/0278441 A1* | 11/2011 | Vermeulen | ............. | G02B 6/124 250/227.23 |

\* cited by examiner

US 10,211,925 B2

HYBRID OPTICAL TRANSMITTER AND/OR RECEIVER STRUCTURE

INCORPORATION BY REFERENCE

The present patent application is a divisional of U.S. Ser. No. 14/699,907, filed Apr. 29, 2015 which claims priority to U.S. Provisional Patent Application No. 61/986,624, filed on Apr. 30, 2014, and priority to U.S. Provisional Patent Application No. 62/009,364, filed on Jun. 9, 2014, and priority to U.S. Provisional Patent Application No. 62/012,974, filed on Jun. 16, 2014, the content of which is incorporated by reference herein in its entirety.

BACKGROUND

A photonic integrated circuit (PIC) may integrate one or more optical devices onto a common substrate. For example, a PIC may include a laser, a photo-diode, a modulator, an optical combining element, an arrayed waveguide grating, a power combiner, an optical multiplexer, an optical demultiplexer, or the like. In a polarization multiplexed configuration, the PIC may include a polarization beam combiner, a polarization rotators, a polarization beam splitter, or the like. Silicon photonics (SIP) circuitry may include one or more optical devices utilized for manipulating an optical signal received from a laser. For example, SIP circuitry may include an optical combiner, an optical splitter, a modulator, or the like.

SUMMARY

According to some possible implementations, a device may include a substrate. The device may include a carrier mounted to the substrate. The device may include a transmitter photonic integrated circuit (PIC) mounted on the carrier. The transmitter PIC may include a plurality of lasers that generate an optical signal when a voltage or current is applied to one of the plurality of lasers. The device may include a first microelectromechanical structure (MEMS) mounted to the substrate. The first MEMS may include a first set of lenses. The device may include a planar lightwave circuit (PLC) mounted to the substrate. The PLC may be optically coupled to the plurality of lasers by the first set of lenses of the first MEMS. The device may include a second MEMS mounted to the substrate. The second MEMS may include a second set of lenses. The second set of lenses may be configured to optically couple the PLC to an optical fiber.

According to some possible implementations, a device may include a lens attachment portion. The lens attachment portion may be configured to receive a lens. The device may include a first branch extending from the lens attachment portion in a first direction. The first branch may be configured to adjust an optical coupling of the lens. The device may include a second branch extending from the lens attachment portion in a second direction that is substantially opposite from the first direction. The second branch may be configured to adjust the optical coupling of the lens. The device may include an actuator arm extending from the lens attachment portion in a third direction that is substantially orthogonal to the first direction and the second direction. The actuator arm may be configured to adjust the optical coupling of the lens. The device may include a pivot extending from the lens attachment portion in a fourth direction that is substantially orthogonal to the first direction, the second direction, and the third direction.

According to some possible implementations, a device may include a substrate. The device may include a first photonic integrated circuit (PIC) mounted on the substrate. The first PIC may include a photodetector. The device may include a second PIC mounted on the substrate. The second PIC may include a set of optical devices. The device may include a first aligner mounted on the substrate. The first aligner may include a first set of lenses. The first set of lenses may be configured to optically couple the first PIC to the second PIC. The device may include a second aligner mounted on the substrate. The second aligner may include a second set of lenses. The second set of lenses may be configured to optically couple the second PIC to an optical fiber.

DETAILED DESCRIPTION

Figure 1A:
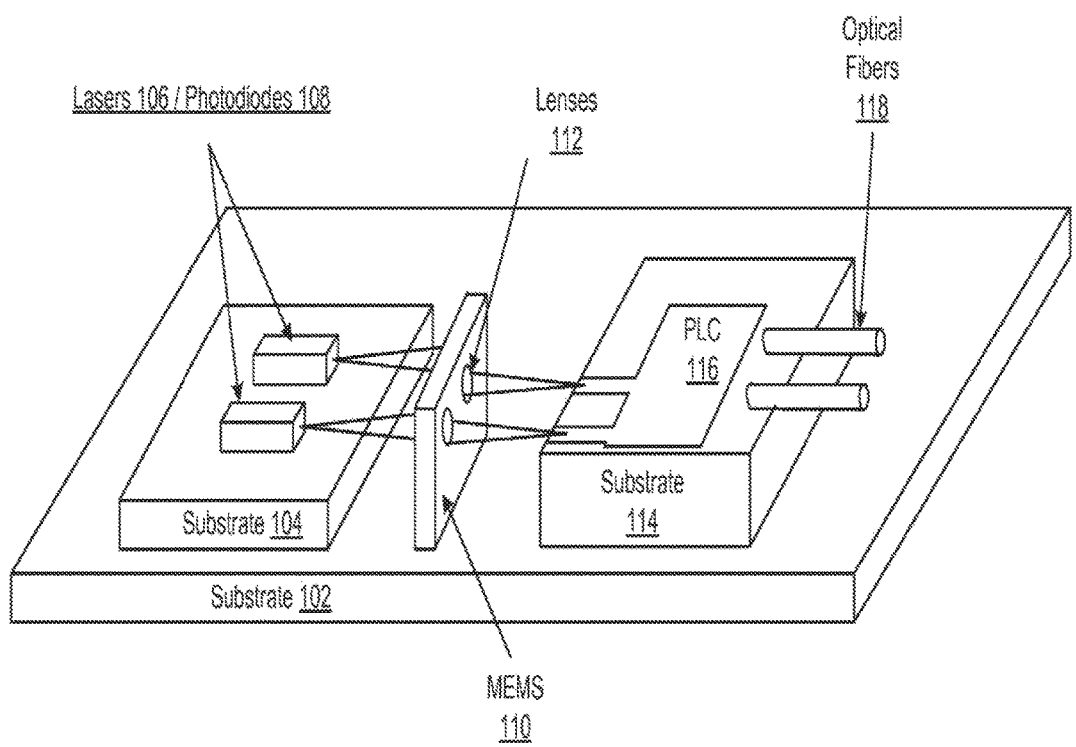
FIGS. 1A-1E are diagrams of an overview of an example implementation described herein.

The following detailed description of example implementations refers to the accompanying drawings. The same reference numbers in different drawings may identify the same or similar elements.

A wavelength division multiplexed (WDM) optical communication system may be utilized to transmit a set of optical signals between two or more nodes of a network. The set of optical signals may be combined using an optical multiplexer and transmitted from a transmit node of the network, via an optical fiber, to a receive node of the network. The set of optical signals may be demultiplexed at the receive node, and each optical signal, of the set of optical signals, may be provided to a corresponding receiver of a set of receivers. A particular receiver, of the set of receivers, may include a photodiode and may generate an electrical signal based on a received optical signal. The electrical signal may be processed by one or more signal processing devices.

A photonic integrated circuit (PIC) may include multiple optical devices integrated onto a common substrate (e.g., which may include multiple layers of material, such as electric conducting material, electric insulating material, or the like). For example, a transmitter (TX) PIC may include one or more lasers, modulators, optical combining elements, or the like. Similarly, a receiver (RX) PIC may include one or more photodiodes, optical combining elements, or the like. A substrate for a PIC may utilize a particular material, such as a Group III-V based material (e.g., Gallium-Arsenide (GaAS), Indium-Phosphide (InP), etc.), a Group II-VI based material, or the like. However, Group III-V materials and Group II-IV materials may be expensive and fragile, resulting in difficulty obtaining a wafer substrate of a size sufficient to produce a hybrid optical transmitter and/or receiver structure that incorporates optical elements of a PIC, silicon photonics (SIP) circuitry, optical fibers, or the like. It may, therefore, be beneficial to position some optical elements on the PIC and other optical elements on another substrate, and integrate the PIC and the other substrate onto a common substrate.

Integrating multiple optical elements onto a common substrate and/or a set of substrates mounted onto the common substrate may require a precise interconnection to optically couple an optical output of a first optical device to an optical input of a second optical device. For example, an interconnect between a laser, of a PIC, and a planar lightwave circuit (PLC), of a SIP, may require a level of accuracy of alignment at a sub-micron level in multiple dimensions to facilitate effective optical power transfer from the laser to the PLC. However, dimensions of a PIC, which includes the laser, and a SIP, which includes the PLC, may not be manufactured within a tolerance less than approximately 5 microns to 10 microns. Implementations, described herein, may utilize a common substrate (e.g., an interposer) onto which is mounted a set of optical devices and a microelectromechanical structure (MEMS) with a lens to optically couple the set of optical devices. In this way, optical devices may be integrated into a common package, which includes a relatively small PIC, with a lesser expense relative to integrating the optical devices onto a relatively large PIC.

FIGS. 1A-1E are diagrams of an overview of an example implementation 100 described herein. FIGS. 1A-1E show examples of a hybrid optical transmitter and/or receiver structure that utilizes a microelectromechanical structure (MEMS) to optically couple two or more optical devices.

As shown in FIG. 1A, a hybrid optical transmitter and/or receiver structure may include a substrate 102 as a platform upon which other substrates and/or optical devices are mounted. For example, substrate 102 may integrate a substrate 104 (e.g., a PIC that includes one or more lasers 106 and/or one or more photodiodes 108), a MEMS 110 (e.g., which may include a set of lenses 112), and a substrate 114 (e.g., which may include a planar lightwave circuit (PLC) 116 and a set of optical fibers 118). Substrate 102 may include a metal-based material, such as a nickel-cobalt ferrous alloy (e.g., a Kovar® alloy), or the like.

Substrate 104 may include a PIC, in some implementations. For example, substrate 104 may include a TX PIC, an RX PIC, or a TX/RX PIC (e.g., a PIC that includes both transmitter optical devices and receiver optical devices). In some implementations, substrate 104 may include an indium phosphide (InP) based substrate. In some implementations, optical devices provided on substrate 104 may include a Group III-V material based optical device, such as a Gallium-Arsenide (GaAS) based optical device, an InP based optical device, or the like.

In some implementations, substrate 104 may include an optical source, such as one or more lasers 106 (hereinafter referred to individually as "laser 106," and collectively as "lasers 106") (e.g., an optical laser), for generating an optical signal. For example, laser 106 may include a directly modulated laser that generates light based on a voltage and/or a current being applied to laser 106. Additionally, or alternatively, laser 106 may be associated with a modulator, such as a Mach-Zehnder modulator that may be mounted on substrate 104. In some implementations, substrate 104 may include an optical receiver, such as one or more photodiodes 108 (hereinafter referred to individually as "photodiode 108," and collectively as "photodiodes 108"), for receiving an optical signal. For example, photodiode 108 may receive an optical signal and generate an electrical signal based on the optical signal. Additionally, or alternatively, substrate 104 may include another type of photodetector.

The term "mounted on," "mounted to," or the like may be used to refer to being mounted directly on, mounted indirectly on, mounted directly to, mounted indirectly to, or the like. For example, a first substrate mounted on a second substrate may refer to the first substrate being mounted directly on the second substrate without an intermediate layer, the first substrate being mounted indirectly on the second substrate with an intermediate layer, or the like.

In some implementations, laser 106 may transmit an optical signal toward one or more optical devices of substrate 114, such as PLC 116 or the like. For example, laser 106 may transmit the optical signal to PLC 116 via lens 112. Additionally, or alternatively, photodiode 108 may receive an optical signal from one or more optical devices of substrate 114. For example, photodiode 108 may receive the optical signal from PLC 116 via lens 112.

MEMS 110 may include an actuatable structure, in some implementations. For example, MEMS 110 may include a MEMS actuator (e.g., that utilizes a MEMS actuation technique), a piezoelectric actuator (that utilizes a piezoelectric actuation technique), a magnetic actuator (e.g., that utilizes a magnetic actuation technique), or the like. Additionally, or alternatively, MEMS 110 may be a thermally actuatable structure. For example, MEMS 110 may include one or more materials that may be actuated in a predictable manner (e.g., by expanding a particular expansion, contracting a particular contraction, bending a particular angle, twisting a particular angle, or the like) based on altering a temperature of the material. In some implementations, MEMS 110 may actuate by elastic deformation, such as by thermal actuation, piezoelectric actuation, or the like. For example, application of a thermal gradient may cause MEMS 110 to deform, thereby positioning lens 112.

In some implementations, MEMS 110 may include one or more lenses 112 (hereinafter referred to individually as "lens 112," and collectively as "lenses 112") for optically coupling multiple optical devices of the hybrid optical transmitter and/or receiver structure. For example, MEMS 110 may include a focusing lens 112, a collimating lens 112, or the like. Although FIG. 1A shows lens 112, lens 112 may be replaced with one or more optical devices other than a lens, such as a mirror or the like. In some implementations, MEMS 110 may actuate to adjust a position and/or an orientation of lens 112 to facilitate optically coupling. For example, MEMS 110 may cause lens 112 to direct light from laser 106 to PLC 116. Additionally, or alternatively, MEMS 110 may cause lens 112 to direct light from PLC 116 to photodiode 108.

In some implementations, lens 112 may include a collimating lens that may facilitate a greater distance between laser 106/photodiode 108 and PLC 116 relative to utilizing another type of lens. In this way, the hybrid optical transmitter and/or receiver structure may be more easily and/or efficiently manufactured relative to another optical device where the laser 106/photodiode 108 is required to be positioned relatively closer to PLC 116.

Substrate 114 may include a silicon-based substrate, such as a SIP or the like, in some implementations. For example, substrate 114 may be fabricated in a similar manner to a complementary metal-oxide semiconductor (CMOS) circuit, and may include a region onto which SIP circuitry is located, such as SIP circuitry fabricated on the substrate, SIP circuitry fabricated on another substrate which is mounted to the substrate, or the like. Additionally, or alternatively, substrate 114 may include a PIC, such as a TX PIC, an RX PIC, a TX/RX PIC or the like. In some implementations, substrate 114 may include one or more optical devices associated with a silicon-based material, such as silicon oxynitride, silicon nitride, silicon oxide, or the like.

In some implementations, substrate 114 may include PLC 116 and/or one or more optical fibers 118 (hereinafter referred to individually as "optical fiber 118," and collectively as "optical fibers 118"). For example, substrate 114 may be configured to receive a PLC 116 mounted onto substrate 114, integrated into substrate 114, or the like. Additionally, or alternatively, substrate 114 may be configured to receive optical fiber 118, which may be attached to substrate 114 and/or PLC 116 via an adhesive technique (e.g., an epoxy), a welding technique (e.g., a laser weld), or the like. In some implementations, substrate 114 may include a PIC that includes PLC 116. For example, PLC 116 may be associated with a PIC that is mounted to substrate 102 and includes a substrate 114 (e.g., a substrate of the PIC).

In some implementations, PLC 116 may receive an optical signal from laser 106 (e.g., via lens 112), process the optical signal, and provide the optical signal to optical fiber 118 for output. Additionally, or alternatively, PLC 116 may receive an optical signal from optical fiber 118, process the optical signal, and provide the optical signal to photodiode 108 (e.g., via lens 112) for photodetection. Additionally, or alternatively, PLC 116 may receive the optical signal from and/or provide the optical signal to another optical device, such as another PLC 116 or the like.

In some implementations, PLC 116 and/or one or more other optical devices of substrate 114 may perform a particular processing technique on an optical signal, such as optical multiplexing, optical demultiplexing, polarization combining, polarization splitting, polarization rotation, modulation, or the like. For example, PLC 116 may include a 90-degree optical hybrid circuit that combines an optical signal with an oscillation signal. Processing performed by PLC 116 is described in detail, herein, with regard to FIGS. 3A-3C.

In some implementations, optical signals output by the hybrid optical transmitter and/or receiver structure may be modulated (e.g., by PLC 116, by a modulator of a PIC, or the like) to achieve a particular data rate. For example, a transmitter portion may output one or more optical signals at a data rate of approximately 50 gigabits per second (Gbps), approximately 100 Gbps, approximately 200 Gbps, or another data rate. Further to the example, in a first configuration with one laser 106, supplying light modulated to a data rate of 50 Gbps (e.g., termed a "1×50" configuration), the transmitter portion may achieve a data rate of 50 Gbps. In a second configuration with two lasers 106, each supplying light modulated to a data rate of 50 Gbps (e.g., termed a "2×50" configuration), the transmitter portion may achieve a total combined data rate of 100 Gbps. In a third configuration with two lasers 106, each supplying light modulated to a data rate of 100 Gbps (e.g., termed a "2×100" configuration), the transmitter portion may achieve a total combined data rate of 200 Gbps. A receive portion may achieve similar data rates using similar modulators and one or more photodiodes 108. Although described herein in terms of a particular set of data rate configurations, other configurations are possible that differ from the configurations described herein.

Figure 1B:
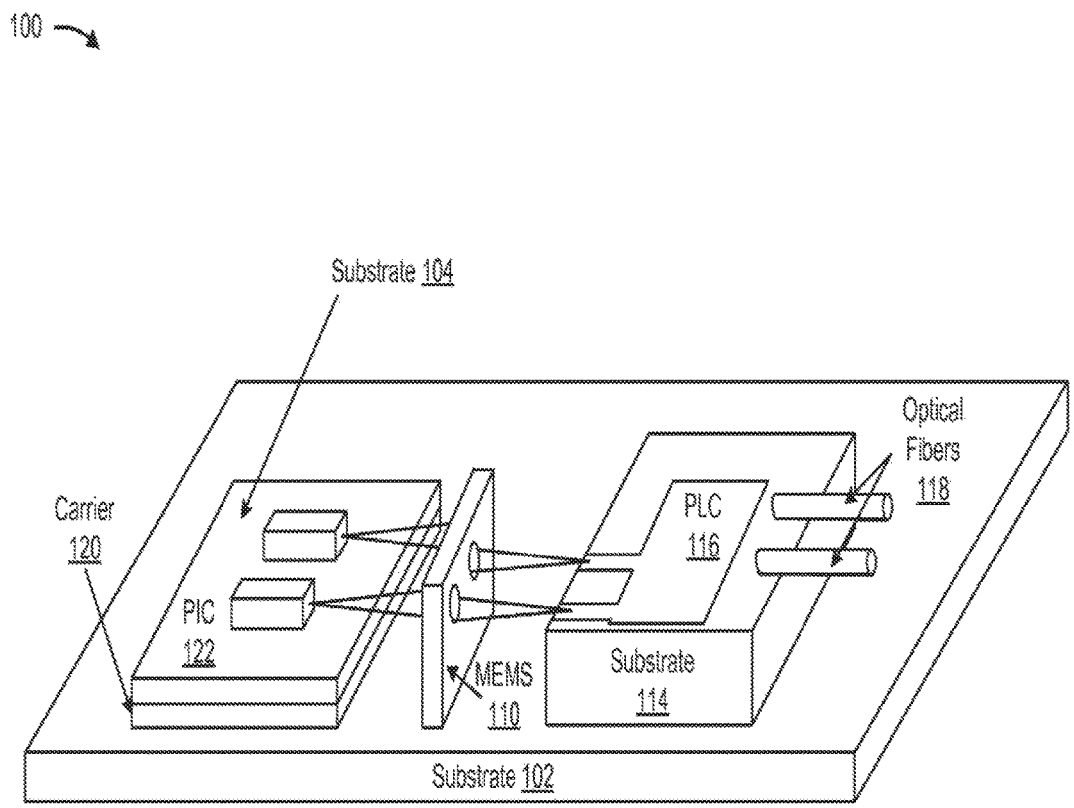

As shown in FIG. 1B, the hybrid optical transmitter and/or receiver structure may include a carrier 120. For example, substrate 102 may be configured to receive carrier 120, and carrier 120 may facilitate attachment of substrate 104 (e.g., a PIC 122) to substrate 102. Carrier 120 may include an epitaxial layer associated with an aluminum nitride based material that is deposited onto substrate 102, mounted to substrate 102, or the like. In this way, carrier 120 may facilitate indirect mounting of substrate 104 (e.g., PIC 122).

Figure 1C:
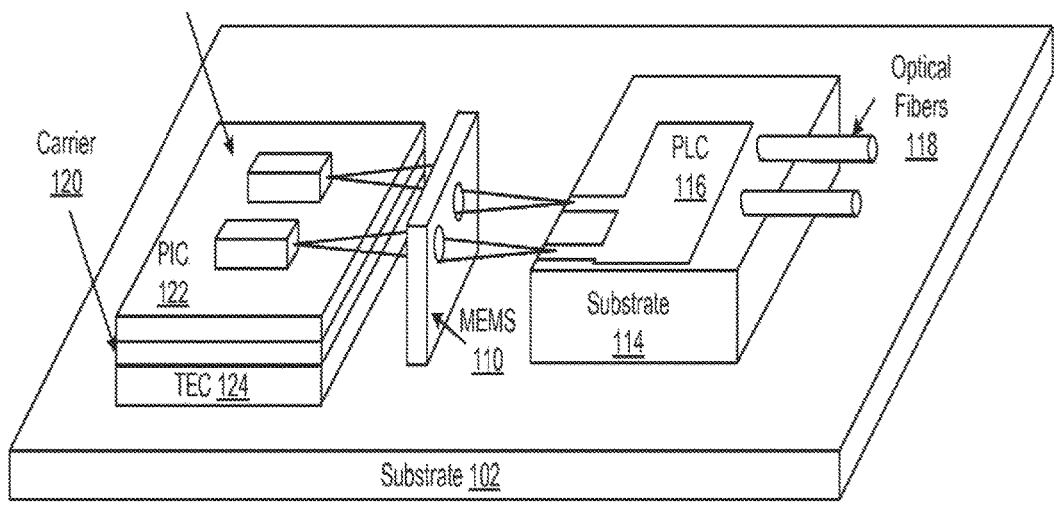

As shown in FIG. 1C, the hybrid optical transmitter and/or receiver structure may include a thermo-electric cooler (TEC) 124. For example, substrate 102 may be configured to receive TEC 124, onto which carrier 120 may be mounted. TEC 124 may include a module associated with altering a temperature of PIC 122 and/or one or more optical devices thereof. For example, TEC 124 may include a heat-sink that prevents PIC 122 from overheating. Additionally, or alternatively, TEC 124 may facilitate dynamic temperature adjustment, such as by altering a rate at which heat is removed from PIC 122. In this way, TEC 124 may facilitate adjustment of a thermally tunable laser 106 of PIC 122.

Figure 1D:
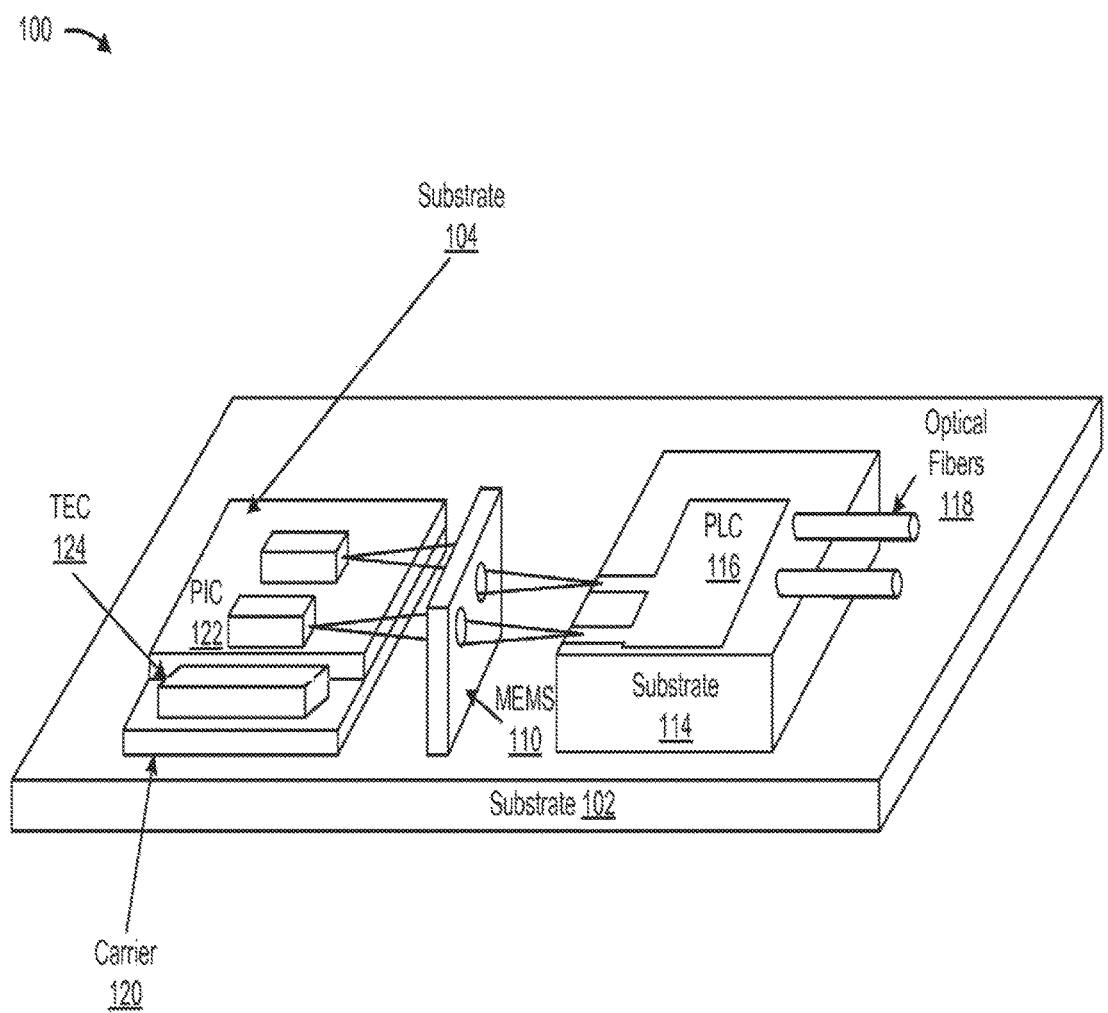

As shown in FIG. 1D, the hybrid optical transmitter and/or receiver structure may include a TEC 124 in another configuration. For example, substrate 102 may be configured to receive carrier 120 onto which both substrate 104 (e.g., PIC 122) and TEC 124 are mounted in an approximately adjacent configuration. In this way, TEC 124 may facilitate thermal modulation of substrate 104 (e.g., PIC 122) without being directly mounted to substrate 102 and without TEC 124 being designed to facilitate substrate 104 being mounted onto TEC 124.

Figure 1E:
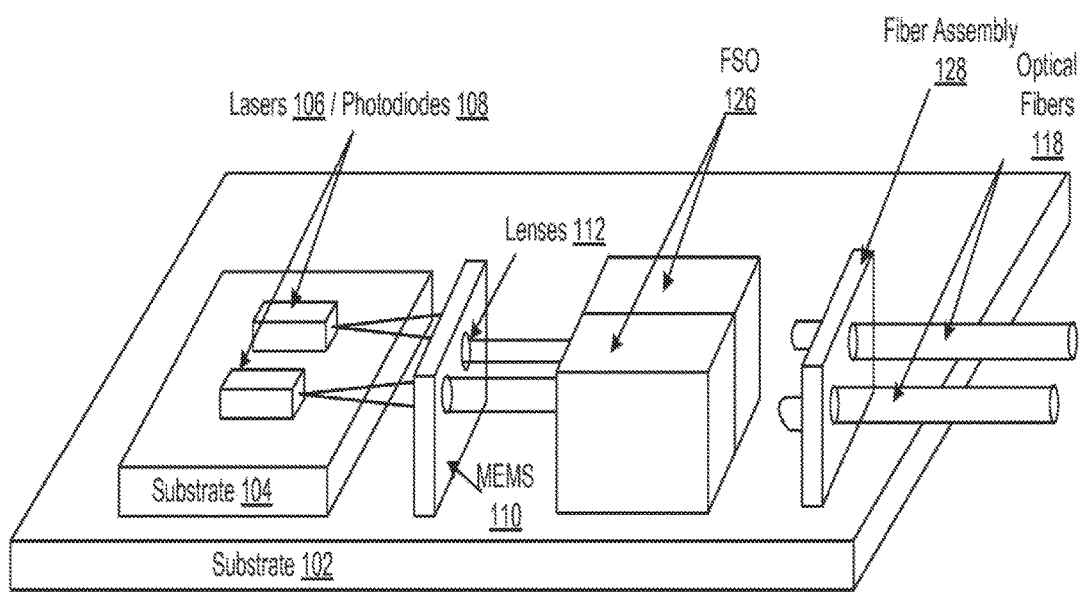

As shown in FIG. 1E, the hybrid optical transmitter and/or receiver structure may include one or more optical devices in another configuration. For example, substrate 102 may include one or more free-space optics devices (FSO) 126 (hereinafter referred to individually as "FSO 126," and collectively as "FSO 126"). In some implementations, FSO 126 may include one or more optical devices associated with processing an optical signal. For example, FSO 126 may perform polarization rotation, transverse electric (TE) polarization, transverse magnetic (TM) polarization, or the like. When lens 112 is a collimating lens, FSO 126 may be positioned further from laser 106/photodiode 108 relative to when another lens configuration and/or type, thereby easing manufacture of the hybrid optical transmitter and/or receiver structure, facilitating thermal isolation of FSO 126 from laser 106 and/or photodiode 108, or the like.

As further shown in FIG. 1E, optical fiber 118 may be associated with a fiber assembly 128 that maintains an optical coupling between optical fiber 118 and FSO 126. For example, optical fiber 118 may be welded to fiber assembly 128 (e.g., via laser welding), epoxied to fiber assembly 128, soldered to fiber assembly 128, or the like. In another example, optical fiber 118 may be mounted to substrate 102 without a fiber assembly 128, such as via a welding technique, an epoxying technique, a soldering technique, or the like.

In this way, a hybrid optical transmitter and/or receiver structure utilizes a MEMS to optically couple multiple optical devices, thereby facilitating integration of the multiple optical devices onto a common substrate.

Figure 2:
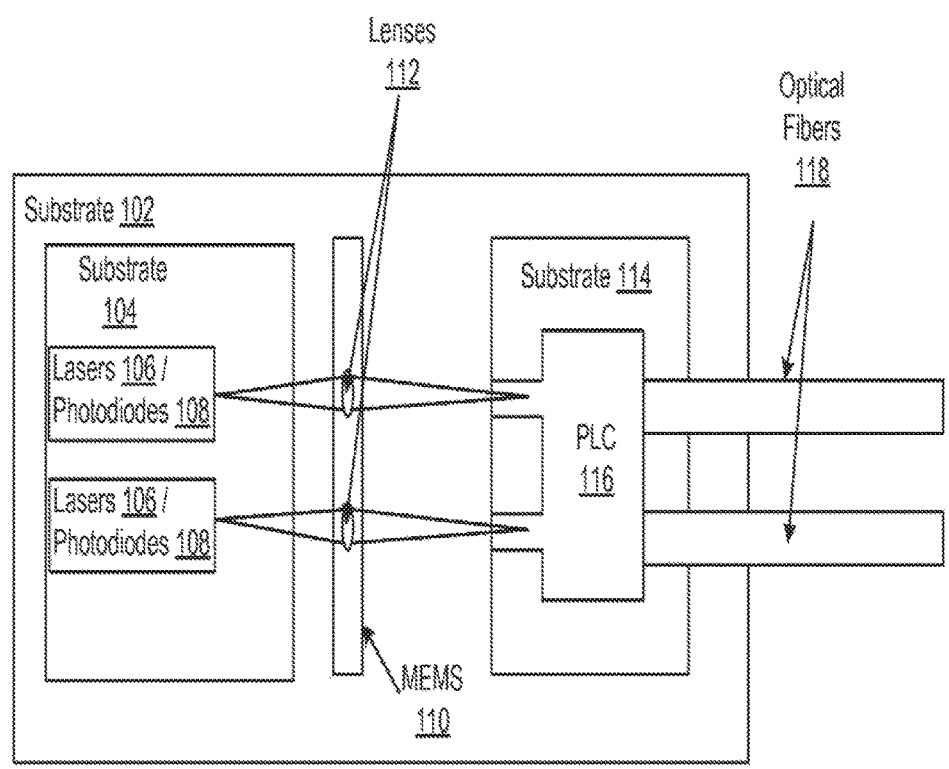
FIG. 2 is a diagram of an example hybrid optical transmitter and/or receiver structure.

FIG. 2 is a diagram of an example implementation 200 of a hybrid optical transmitter and/or receiver structure. As shown in FIG. 2, in a top-down plan view, substrate 102 includes substrate 104, MEMS 110, and substrate 114.

Substrate 104 may include a set of lasers 106/photodiodes 108 that provides an optical signal to/receives an optical signal from lenses 112 of MEMS 110. MEMS 110 may be associated with aligning lenses 112 to optically couple lasers 106/photodiodes 108 to PLC 116 of substrate 114. PLC 116 may receive an optical signal from and/or provide an optical signal to lenses 112 and may, correspondingly, provide the optical signal to and/or receive the optical signal from optical fibers 118. Optical fibers 118 may facilitate input/output of the optical signal. In this way, the hybrid optical transmitter and/or receiver structure may provide a processed signal to another optical device and/or receive an optical signal for processing and detection from another optical device.

As indicated above, FIG. 2 is provided merely as an example. Other examples are possible and may differ from what was described with regard to FIG. 2.

Figure 3A:
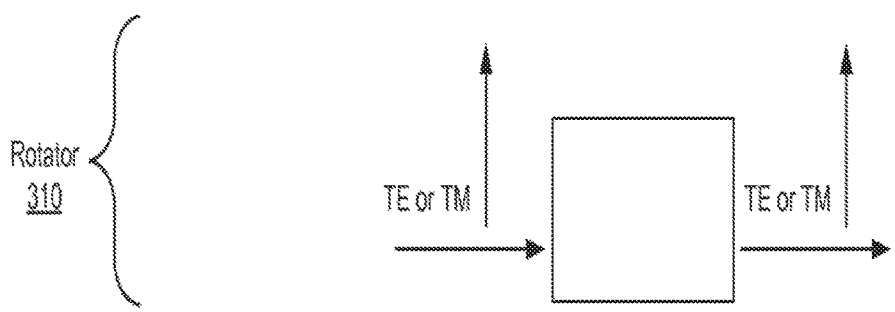
FIGS. 3A-3C are diagrams of example components of a planar lightwave circuit (PLC) shown in FIGS. 1A-1D.
Figure 3A:
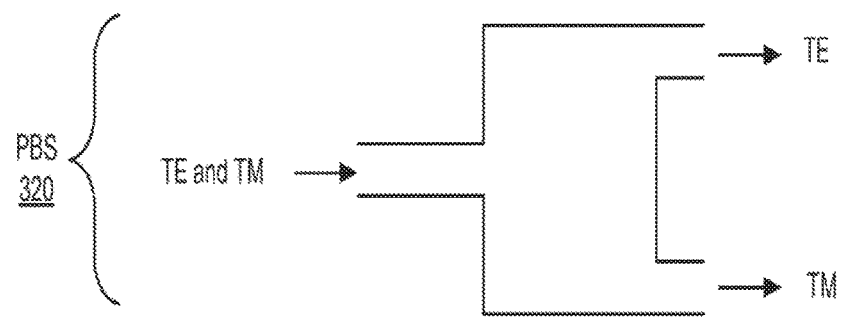
Figure 3A:
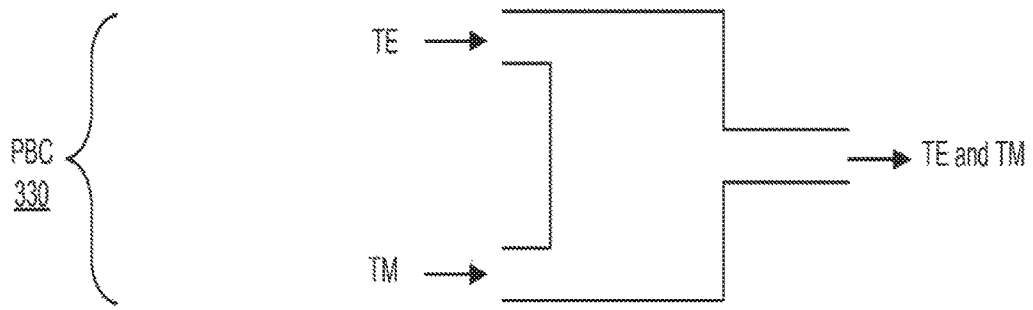
Figure 3B:
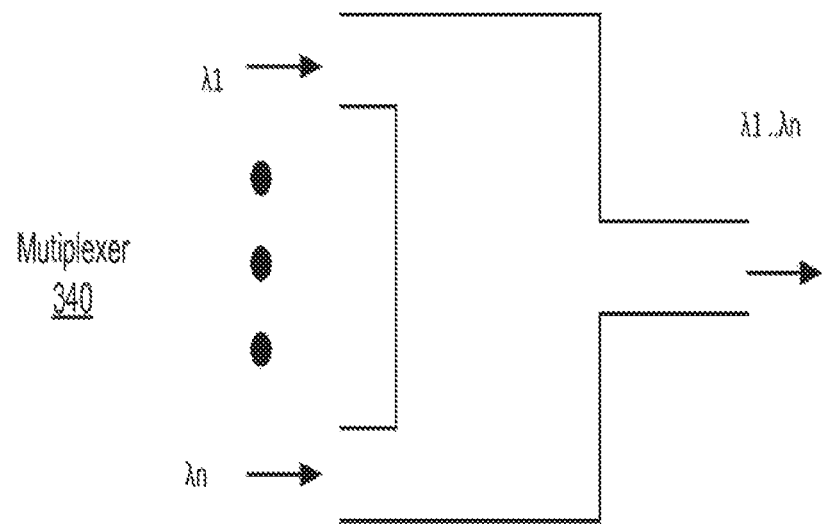
Figure 3B:
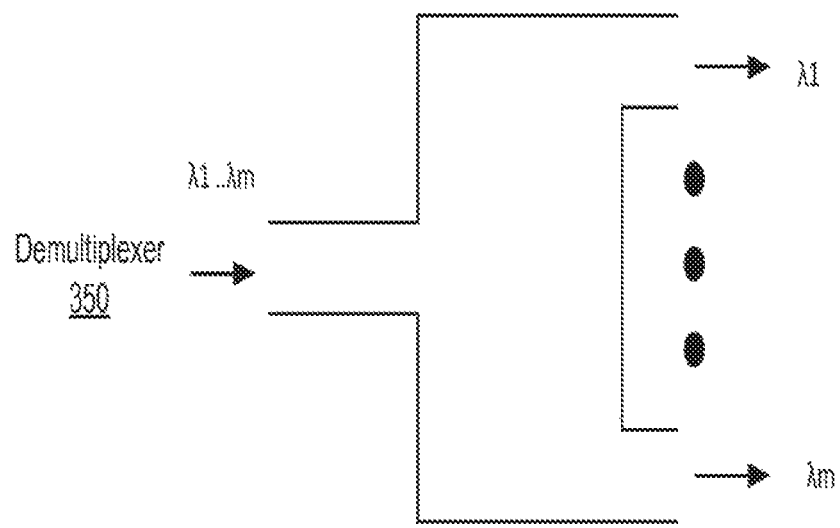
Figure 3C:
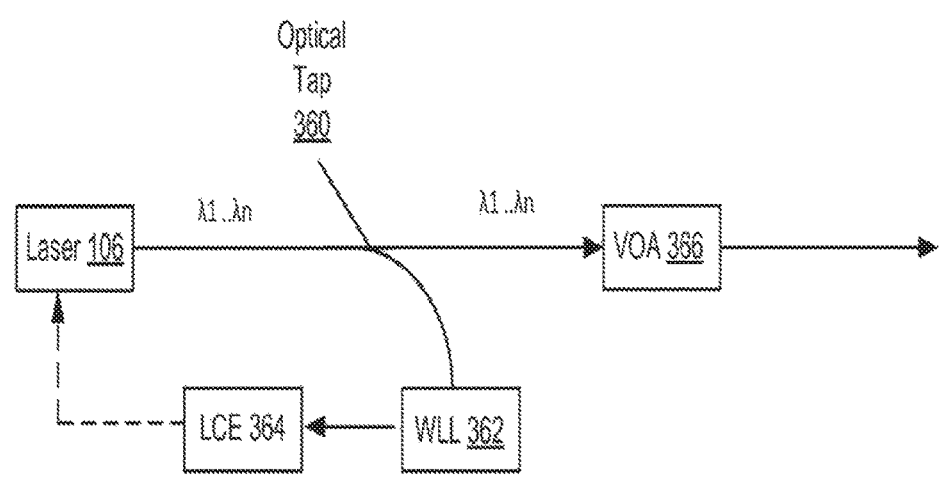

FIGS. 3A-3C are diagrams of components of PLC 116 shown in FIGS. 1A-1E. As shown in FIG. 3A, PLC 116 may include a rotator 310, a polarization beam splitter (PBS) 320, and/or a polarization beam combiner (PBC) 330, which are illustrated diagrammatically herein.

As further shown in FIG. 3A, with regard to rotator 310, rotator 310 may receive, from laser 106 (not shown), an optical signal, which is polarized into a transverse magnetic (TM) component and a transverse electric (TE) component. Rotator 310 may rotate an axis of polarization of the optical signal, and may provide the optical signal for transmission via optical fiber 118 (not shown). In another example, rotator 310 may receive the optical signal via optical fiber 118, and may rotate the axis of polarization of the optical signal for transmission to photodiode 108.

As further shown in FIG. 3A, with regard to PBS 320, PBS 320 may receive, via a single input and from laser 106 (not shown), an optical signal with a TE component and a TM component, and may provide the TE component of the optical signal at a first output and the TM component of the optical signal at a second output (e.g., to optical fiber 118 (not shown)). In another example, PBS 320 may receive the optical signal from optical fiber 118 and provide the optical signal to photodiodes 108 (not shown).

As further shown in FIG. 3A, with regard to PBC 330, PBC 330 may receive, from laser 106 (not shown), a TE component of an optical signal at a first input and a TM component of the optical signal at a second input, and may provide the TE component and the TM component via a single output (e.g., to optical fiber 118 (not shown)). In another example, PBC 330 may receive the optical signal from optical fiber 118 and provide the optical signal to photodiode 108 (not shown). In this way, the hybrid optical transmitter and/or receiver structure may manipulate polarization of an optical signal.

As shown in FIG. 3B, PLC 116 may include a multiplexer 340 (e.g., a wavelength division multiplexer) and/or a demultiplexer 350 (e.g., a wavelength division demultiplexer), which may be illustrated diagrammatically herein.

As further shown in FIG. 3B, with regard to multiplexer 340, multiplexer 340 may receive two or more wavelengths of light, $\lambda_1$-$\lambda_n$, from a set of lasers 106 (not shown) and may multiplex the two or more wavelengths of light into a coherent optical signal that includes wavelengths $\lambda_1$-$\lambda_n$, for output to optical fiber 118 (not shown). In another example, multiplexer 340 may receive the two or more wavelengths of light from a set of optical fibers 118 and may provide the coherent optical signal to photodiode 108 (not shown).

As further shown in FIG. 3B, with regard to demultiplexer 350, demultiplexer 350 may receive a coherent optical signal, from a set of lasers 106, that includes two or more wavelengths of light, $\lambda_1$-$\lambda_m$, and may output the coherent optical signal as two or more wavelengths of light via optical fibers 118. In another example, demultiplexer 350 may receive the coherent optical signal from optical fiber 118 and demultiplex the optical signal to provide to photodiodes 108 (not shown). In this way, the hybrid optical transmitter and/or receiver structure may facilitate utilization of wavelength division multiplexed optical signals.

As shown in FIG. 3C, PLC 116 may include an optical tap 360, a wavelength locker (WLL) 362, a laser control element (LCE) 364, and a variable optical attenuator (VOA) 366.

As further shown in FIG. 3C, optical tap 360 may receive an optical signal (e.g., a wavelength division multiplexed optical signal including a set of wavelengths, $\lambda_1$-$\lambda_n$). For example, optical tap 360 may receive the optical signal, and may provide a first portion of the optical signal (e.g., approximately 1% to approximately 10% of the power level of the optical signal) to WLL 362 and a second portion (e.g., a remainder of the optical signal) to VOA 366. VOA 366 may adjust the power level of the second portion of the optical signal to a desired power level (e.g., 250 micro-Watts (μW), 500 μW, 5000 μW, etc.).

As further shown in FIG. 3C, WLL 362 (e.g., a Fabry-Perot WLL) may receive the first portion of the optical signal, and may adjust a wavelength of the optical signal. WLL 362 may provide a control signal to LCE 364 based on the wavelength of the optical signal. LCE 364 may include one or more optical control elements that are associated with controlling laser 106. For example, LCE 364 may include a temperature adjustment element that may adjust a temperature of laser 106 to cause an adjustment to an output wavelength of an optical signal being output by laser 106. In this way, the hybrid optical transmitter and/or receiver structure may facilitate active control of the optical signal.

The number and arrangement of components shown in FIGS. 3A-3C are provided as an example. In practice, PLC 116 may include additional components, fewer components, different components, or differently arranged components than those shown in FIGS. 3A-3C. Additionally, or alternatively, a set of components shown in FIGS. 3A-3C may perform one or more functions described herein as being performed by another set of components of FIGS. 3A-3C.

Figure 4A:
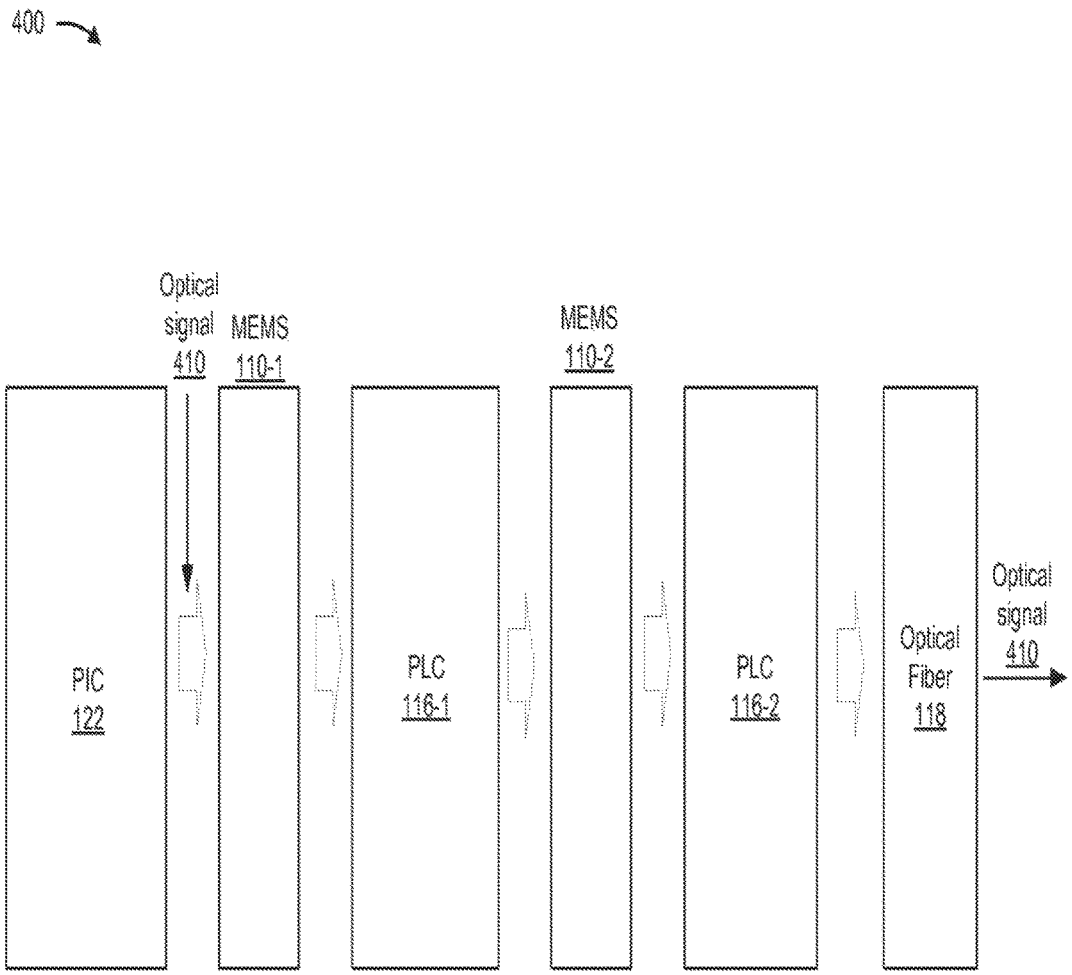
FIGS. 4A-4C are diagrams of an example hybrid optical transmitter and/or receiver structure.
Figure 4B:
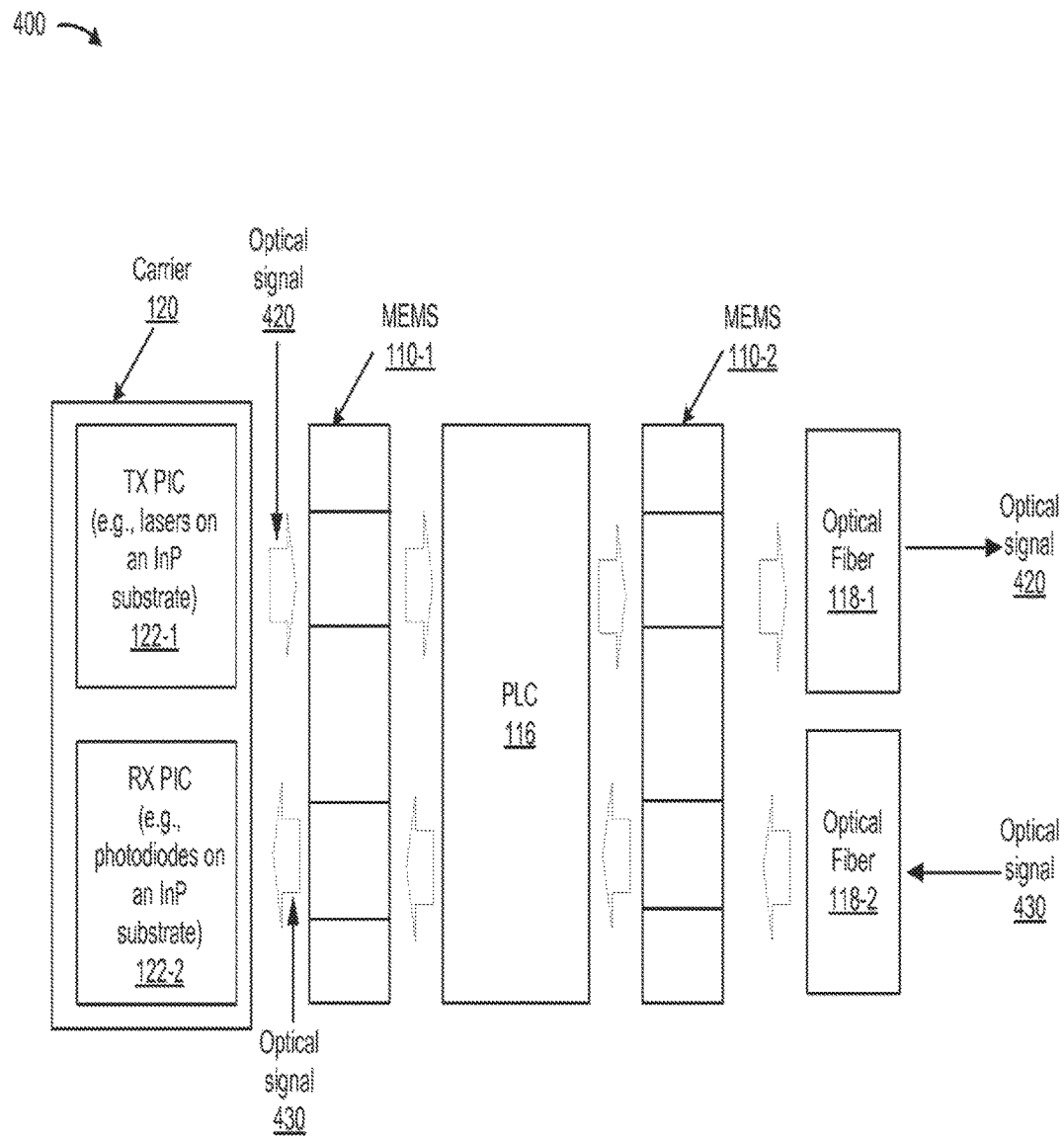
Figure 4C:
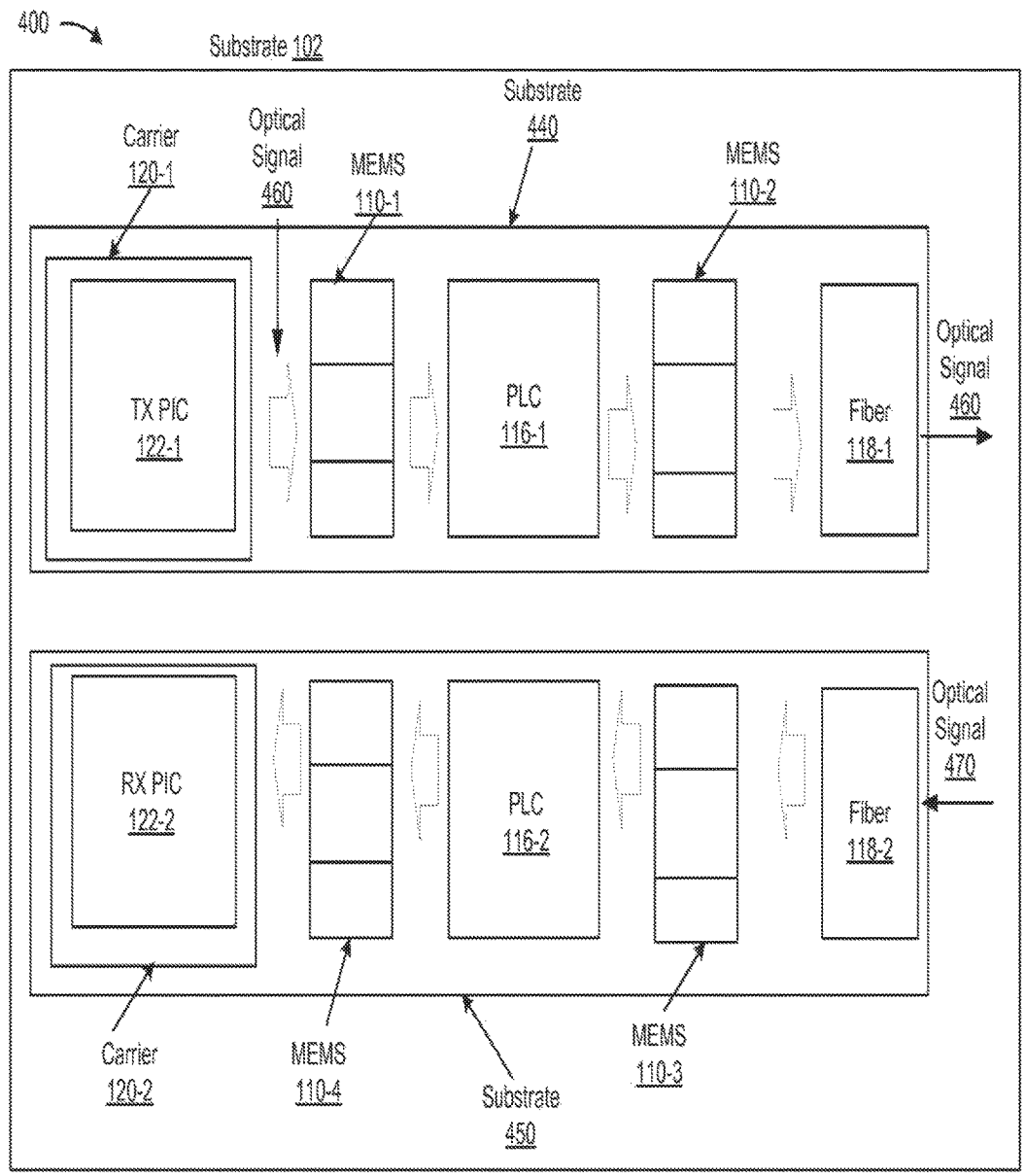

FIGS. 4A-4C are diagrams of an example implementation 400 of a hybrid optical transmitter and/or receiver structure. As shown in FIG. 4A, in a block diagram, the hybrid optical transmitter and/or receiver structure may include a PIC 122, a MEMS 110-1, a PLC 116-1, a MEMS 110-2, a PLC 116-2, and an optical fiber 118. Assume that PIC 122 includes a set of lasers 106, MEMS 110-1 includes a first set of lenses 112, and MEMS 110-2 includes a second set of lenses 112.

As further shown in FIG. 4A, and by reference number 410, PIC 122 provides optical signal 410 to the first set of lenses 112 of MEMS 110-1. MEMS 110-1 causes the first set of lenses 112 direct optical signal 410 to PLC 116-1. Assume that PLC 116-1 processes optical signal 410. PLC 116-1 provides optical signal 410 to the second set of lenses 112 of MEMS 110-2. MEMS 110-2 causes the second set of lenses 112 to direct optical signal 410 to PLC 116-2. Assume that PLC 116-2 processes optical signal 410. PLC 116-2 provides optical signal 410 to optical fiber 118 for output. In this way, the hybrid optical transmitter and/or receive structure may facilitate multi-step optical signal processing using multiple PLCs 116 optically coupled by multiple sets of lenses 112 of multiple MEMS 110.

As shown in FIG. 4B, in a block diagram, the hybrid optical transmitter and/or receiver structure includes carrier 120, TX PIC 122-1, MEMS 110-1, PLC 116, MEMS 110-2, optical fiber 118-1, and RX PIC 122-2. Assume that TX PIC 122-1 includes a set of lasers 106, MEMS 110-1 includes a first set of lenses 112, MEMS 110-2 includes a second set of lenses 112, and RX PIC 122-2 includes a set of photodiodes 108.

As further shown in FIG. 4B, with regard to a transmitter region of carrier 120 on which TX PIC 122-1 is mounted, TX PIC 122-1 provides optical signal 420 to the first set of lenses 112 of MEMS 110-1. MEMS 110-1 causes the first set of lenses 112 to direct optical signal 420 to PLC 116. Assume that PLC 116 processes optical signal 420. PLC 116 provides optical signal 420 to the second set of lenses 112 of MEMS 110-2. MEMS 110-2 causes the second set of lenses 112 to direct optical signal 420 to optical fiber 118-1 for output.

As further shown in FIG. 4B, with regard to a receiver region of carrier 120 on which RX 122-2 is mounted, optical signal 430 is received as input by optical fiber 118-2 and directed to the second set of lenses 112 of MEMS 110-2. MEMS 110-2 causes the second set of lenses 112 to direct optical signal 430 to PLC 116. Assume that PLC 116 processes optical signal 430. PLC 116 provides optical signal 430 to the first set of lenses 112 of MEMS 110-1. MEMS 110-1 causes the first set of lenses 112 to direct optical signal 430 to RX PIC 112-2 (e.g., where photodiode 108 may receive optical signal 430). In this way, a TX PIC and a RX PIC may be integrated onto the hybrid optical transmitter and/or receiver structure.

As shown in FIG. 4C, in a block diagram, the hybrid optical transmitter and/or receiver structure may include a substrate 102, a first substrate 440 and a second substrate 450. The first substrate 440 may be a transmitter region of the hybrid optical transmitter and/or receiver structure that includes a set of optical devices associated with providing optical signal 460, such as carrier 120-1, TX PIC 122-1, MEMS 110-1, PLC 116-1, MEMS 110-2, and optical fiber 118-1. The second substrate 450 may be a receiver region of the hybrid optical transmitter and/or receiver structure that includes a set of optical devices associated with receiving optical signal 470, such as optical fiber 118-2, MEMS 110-3, PLC 116-2, MEMS 110-4, RX PIC 122-2, and carrier 120-2. Assume that TX PIC 122-1 includes a set of lasers 106 that generate optical signal 460, MEMS 110-1 includes a first set of lenses 112, MEMS 110-2 includes a second set of lenses 112, MEMS 110-3 includes a third set of lenses 112, MEMS 110-4 includes a fourth set of lenses 112, and RX PIC 122-2 includes a set of photodiodes 108 that receive optical signal 470.

As further shown in FIG. 4C, and by reference number 460, TX PIC 122-1 generates optical signal 460 and provides optical signal 460 to the first set of lenses 112 of MEMS 110-1. MEMS 110-1 causes the first set of lenses 112 to direct optical signal 460 to PLC 116-1. Assume that PLC 116-1 process optical signal 460. PLC 116-1 provides optical signal 460 to the second set of lenses 112 of MEMS 110-2. MEMS 110-2 causes the second set of lenses 112 to direct optical signal 460 to optical fiber 118-1 for output.

As further shown in FIG. 4C, and by reference number 470, optical fiber 118-2 receives optical signal 470 as input and provides optical signal 470 to the third set of lenses 112 of MEMS 110-3. MEMS 110-3 causes the third set of lenses 112 to direct optical signal 470 to PLC 116-2. Assume that PLC 116-2 processes optical signal 470. PLC 116-2 provides optical signal 470 to the fourth set of lenses 112 of MEMS 110-4. MEMS 110-4 causes the fourth set of lenses 112 to direct optical signal 470 to RX PIC 122-2 (e.g., the set of photodiodes 108 may receive optical signal 470. In this way, a transmit portion and a receive portion, each associated with a substrate, may be integrated onto a common substrate of a hybrid optical transmitter and/or receiver structure.

As indicated above, FIGS. 4A-4C are provided merely as an example. Other examples are possible and may differ from what was described with regard to FIGS. 4A-4C.

Figure 5A:
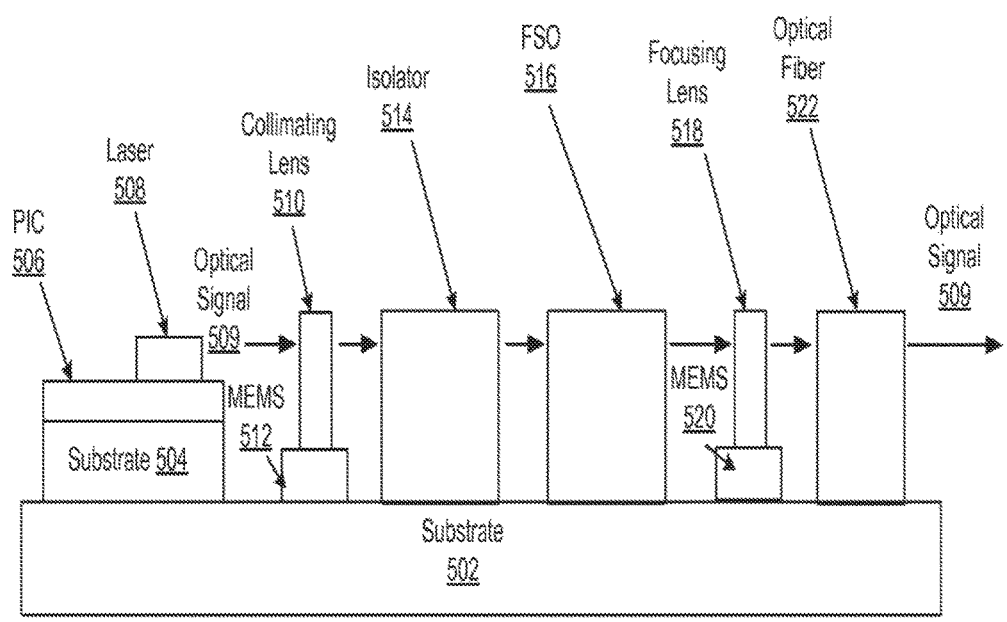
FIGS. 5A-5C are diagrams of an example hybrid optical transmitter and/or receiver structure.
Figure 5B:
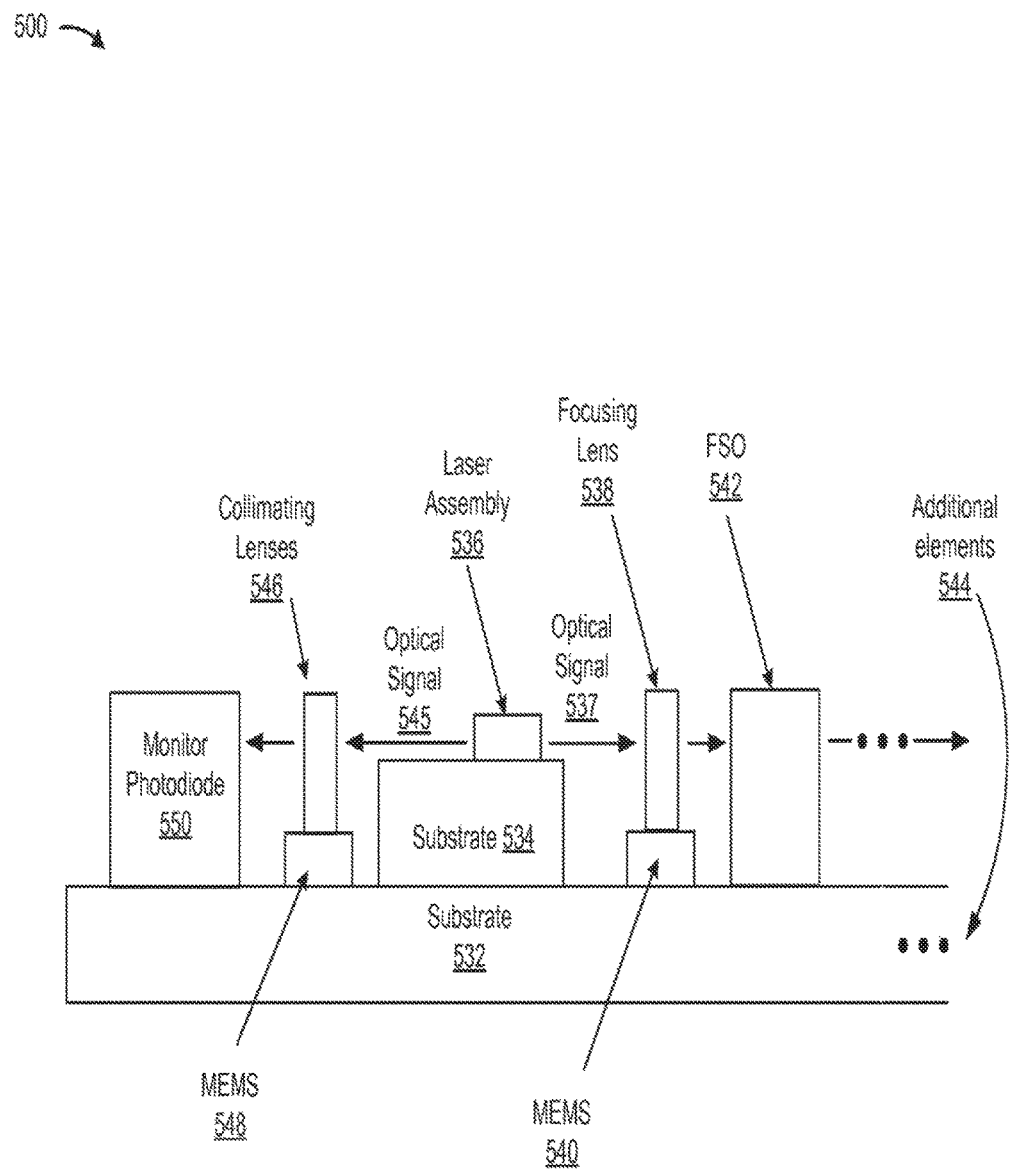
Figure 5C:
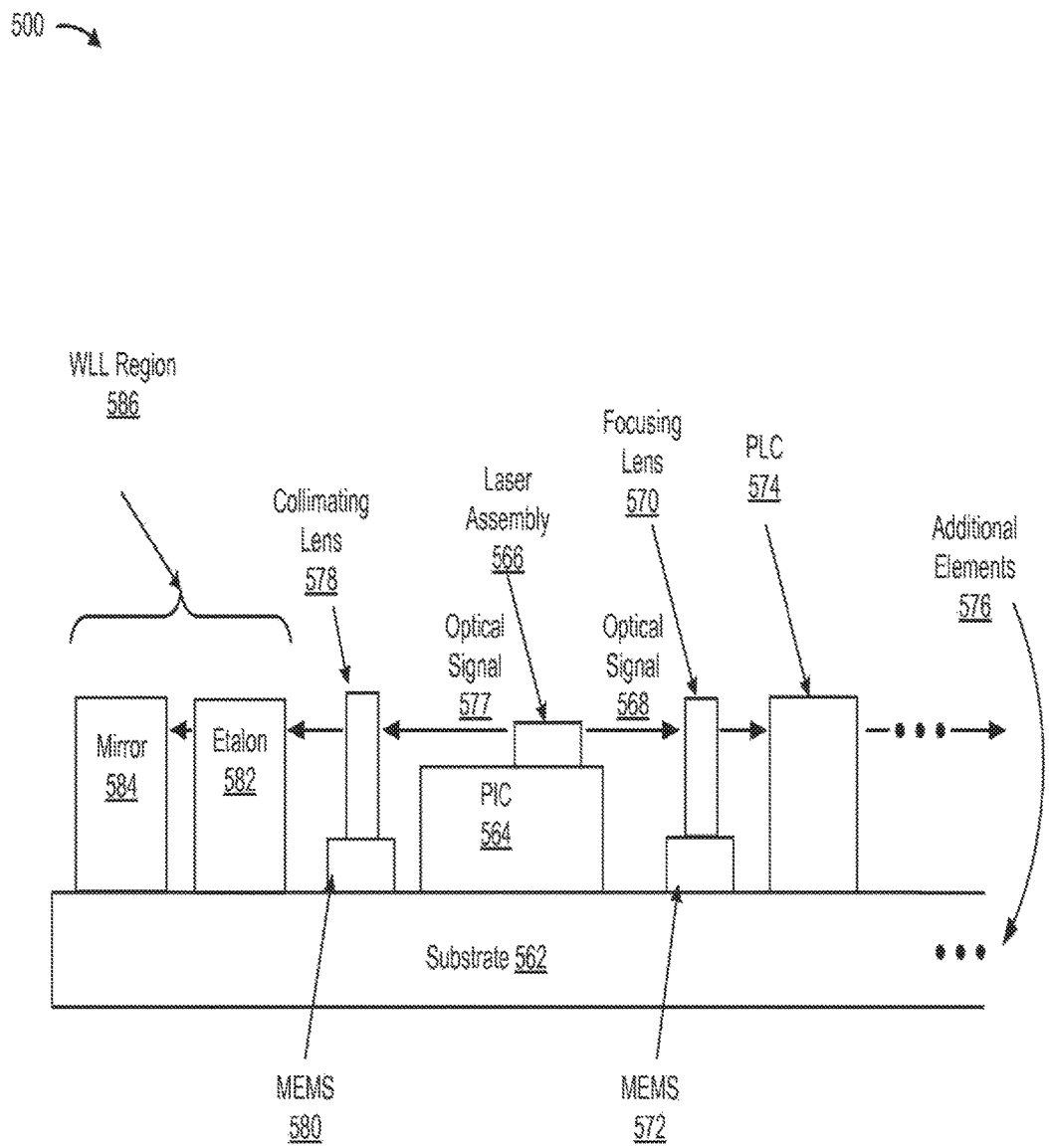

FIGS. 5A-5C show diagrams of an example implementation 500 of a hybrid optical transmitter and/or receiver structure.

As shown in FIG. 5A, in a side view, the hybrid optical transmitter and/or receiver structure includes a substrate 502, onto which a substrate 504 is mounted. Substrate 504 includes a PIC 506 with a laser 508. Laser 508 generates an optical signal 509 that is directed toward collimating lens 510 of MEMS 512. MEMS 512 causes collimating lens 510 to direct optical signal 509 to optical isolator 514. Optical isolator 514 may include an optical device that facilitates a unidirectional transmission of an optical signal. In other words, isolator 514 permits optical signal 509 to be directed from collimating lens 510 toward FSO 516 but prevents another optical signal from being directed from FSO 516 toward collimating lens 510. After processing by one or more optical devices of FSO 516 (e.g., a rotator, a PBS, a PBC, a WLL, etc.), FSO 516 directs optical signal 509 toward focusing lens 518 of MEMS 520. MEMS 520 causes focusing lens 518 to direct optical signal 509 toward optical fiber 522 for output. In this way, the hybrid optical transmitter and/or receiver structure may facilitate unidirectional transmission of an optical signal between optical devices of the structure.

As shown in FIG. 5B, in a side view, the hybrid optical transmitter and/or receiver structure includes a substrate 532 onto which a substrate 534 is mounted. Substrate 534 includes a laser assembly 536 (e.g., an optical source assembly) that includes a lens array with a set of facets which causes an optical signal to be output from laser assembly 536 in both the rightward direction and the leftward direction with respect to FIG. 5B.

As further shown in FIG. 5B, an optical signal 537 is provided to focusing lens 538 of MEMS 540. MEMS 540 causes focusing lens 538 to direct optical signal 537 toward FSO 542 for processing. FSO 542 processes optical signal 537 and provides optical 537 to one or more additional elements 544 mounted onto substrate 532, such as an additional lens, an additional MEMS, an optical fiber, or the like.

As further shown in FIG. 5B, an optical signal 545 is provided to collimating lens 546 of MEMS 548 by laser assembly 536. MEMS 548 causes collimating lens 546 to direct optical signal 545 toward monitor photodiode 550. Monitor photodiode 550 may be a portion of an optical feedback assembly that generates an electric signal based on optical signal 545 for utilization in monitoring laser assembly 536 and/or optical signal 537 generated thereby. For example, based on a wavelength of optical signal 545, monitor photodiode 550 may cause an adjustment to laser assembly 536 to alter a corresponding wavelength of optical signal 537. In this way, the hybrid optical transmitter and/or receiver structure may facilitate feedback control of an optical device of the hybrid optical transmitter and/or receiver structure.

As shown in FIG. 5C, in a side view, the hybrid optical transmitter and/or receiver structure includes a substrate 562 onto which is mounted a PIC 564. PIC 564 includes a laser assembly 566 that includes a set of facets to provide optical signals in both the rightward direction and the leftward direction with respect to FIG. 5C.

As further shown in FIG. 5C, an optical signal 568 is directed by laser assembly 566 toward focusing lens 570 of MEMS 572. MEMS 572 causes focusing lens 570 to direct optical signal 568 to PLC 574 for processing. Based on processing optical signal 568, PLC 574 provides optical signal 568 to one or more additional elements 576 mounted to substrate 562, such as another PLC, an optical fiber, or the like.

As further shown in FIG. 5C, an optical signal 577 is provided to collimating lens 578 of MEMS 580. MEMS 580 causes collimating lens 578 to direct optical signal 577 toward etalon 582 and mirror 584 of a wavelength locking (WLL) region 586. Collectively, WLL region 586 (e.g., etalon 582 and mirror 584) may provide an optical feedback assembly for the hybrid optical transmitter and/or receiver structure. Substrate 562 may be configured to receive etalon 582 and/or mirror 584 via an attachment that facilitates altering a positioning of etalon 582 and/or mirror 584, such as by thermally tuning (e.g., adjusting a temperature to adjust etalon 582 and/or mirror 584). Based on altering a distance between etalon 582 and mirror 584, a wavelength at which laser assembly 566 outputs optical signals may be tuned. Based on tuning at etalon 582 and mirror 584, optical signal 568 may be tuned. In this way, the hybrid optical transmitter and/or receiver structure may facilitate tuning of an optical device provided thereon.

In some implementations, one or more devices of FIGS. 5A-5C may correspond to one or more devices of FIG. 1. For example, substrate 502, 532, or 562 may correspond to substrate 102 of FIGS. 1A-1E; substrate 504 or 534 may correspond to substrate 104 of FIGS. 1A-1E; PIC 506 or 564 may correspond to PIC 122 of FIGS. 1B-1D; laser 508, laser assembly 536, or laser assembly 566 may correspond to lasers 106 of FIGS. 1A-1E; collimating lens 510, 546, or 578 or focusing lens 518, 538, or 570 may correspond to lenses 112 of FIGS. 1A-1E; MEMS 512, 520, 540, 548, 572, or 580 may correspond to MEMS 110 of FIGS. 1A-1E; FSO 516 or 542 may correspond to FSO 126 of FIG. 1E; monitor photodiode 550 may correspond to photodiode 108 of FIGS. 1A-1E; PLC 574 may correspond to PLC 116 of FIGS. 1A-1D and optical fiber 522 may correspond to optical fibers 118 of FIGS. 1A-1E; or the like.

As indicated above, FIGS. 5A-5C are provided merely as examples. Other examples are possible and may differ from what was described with regard to FIGS. 5A-5C.

Figure 6A:
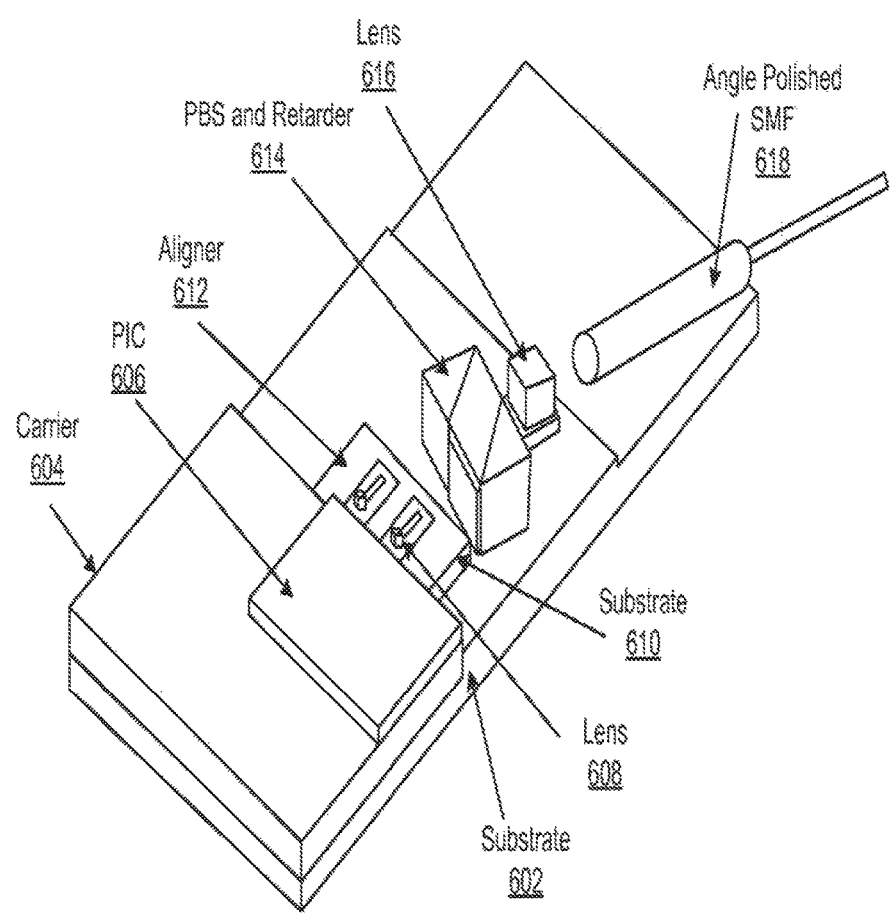
FIGS. 6A-6C are diagrams of an example hybrid optical transmitter and/or receiver structure.
Figure 6B:
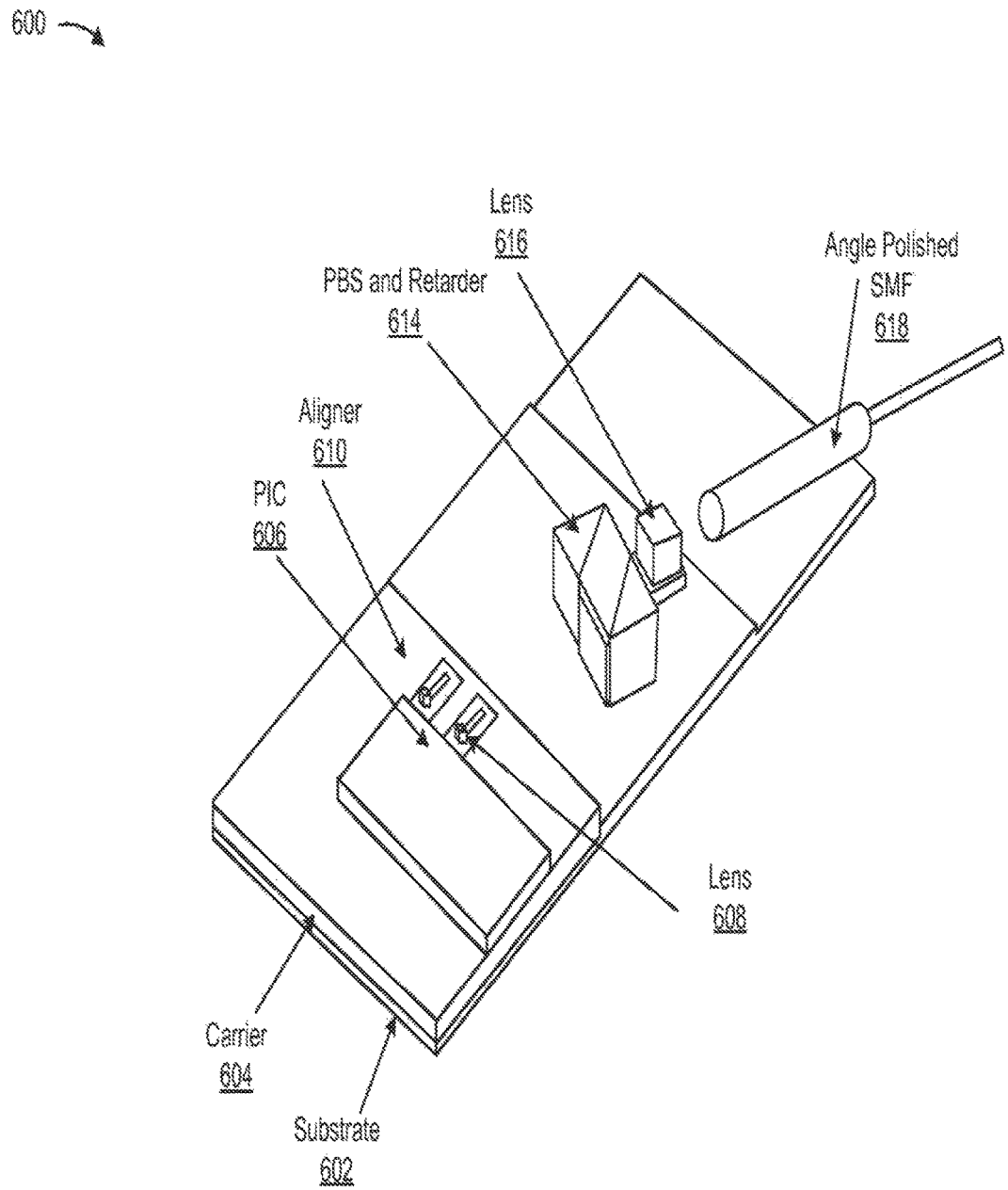
Figure 6C:
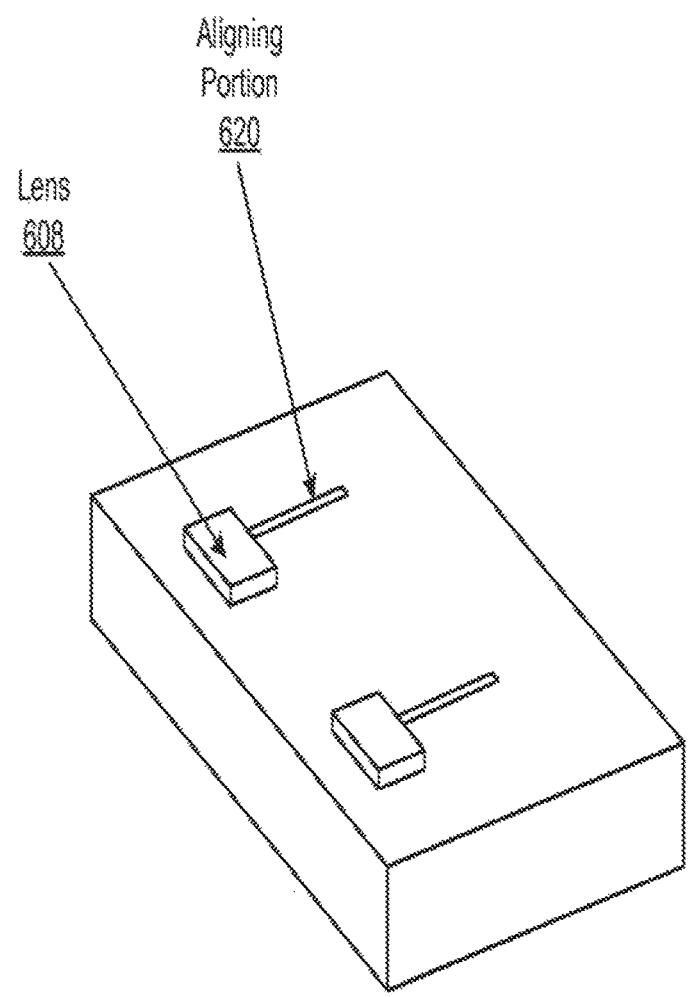

FIGS. 6A-6C show diagrams of an example implementation 600 of a hybrid optical transmitter and/or receiver structure.

As shown in FIG. 6A, in a projection view, the hybrid optical transmitter and/or receiver structure may include a substrate 602 onto which a carrier 604 is mounted. Carrier 604 includes PIC 606, which includes one or more lasers 106 (not shown) and/or one or more photodiodes 108 (not shown). PIC 606 provides an optical signal to a set of lenses 608. In another example, PIC 606 receives the optical signal from the set of lenses 608. Substrate 602 includes a substrate 610 onto which an aligner 612 is mounted. In some implementations, aligner 612 may correspond to MEMS 110 of FIGS. 1A-1E. The set of lenses 608 are mounted to aligner 612, and aligner 612 utilizes the set of lenses 608 to optically couple PIC 606 to PBS and retarder 614. For example, aligner 612 may include a MEMS actuator for positioning and/or orienting the set of lenses 608. PBS and retarder 614 (e.g., a PBS that includes a retarder module for altering a polarization state of the optical signal) receive the optical signal and process the optical signal. PBS and retarder 615 provide the optical signal to lens 616. In another example, PBS and retarder 614 receives the optical signal from lens 616 for processing, and directs the optical signal toward the set of lenses 608. Lens 616 receives the optical signal from PBS and retarder 614 and directs the optical signal toward an optical fiber (e.g., angle polished single-mode optical fiber (SMF) 618) for output.

As shown in FIG. 6B, in a projection view, aligner 612 is mounted directed to carrier 604 rather than being mounted to a substrate 610. In this way, the carrier may facilitate attachment of the aligner rather than the common substrate (e.g., substrate 602), which may reduce cost with respect to fabrication, attachment, or the like relative to another configuration.

As shown in FIG. 6C, in a projection view, aligner 612 include a lens 608 and aligning portion 620. Aligning portion 620 includes a slot or groove in which lens 608 may be repositioned and/or re-oriented, which facilitates optically coupling PIC 606 (not shown) to PBS and retarder 614 (not shown).

In some implementations, one or more devices of FIGS. 6A-6C may correspond to another one or more devices of FIGS. 1A-1E. For example, substrate 602 may correspond to substrate 102 of FIGS. 1A-1E; carrier 604 may correspond to carrier 120 of FIGS. 1B-1D; PIC 606 may correspond to PIC 122 of FIGS. 1B-1D; lens 608 or 616 may correspond to lens 112 of FIGS. 1A-1E; aligner 612 may correspond to MEMS 110 of FIGS. 1A-1E; and/or angle polished SMF 618 may correspond to optical fibers 118 of FIGS. 1A-1E.

As indicated above, FIGS. 6A-6C are provided merely as examples. Other examples are possible and may differ from what was described with regard to FIGS. 6A-6C.

Figure 7A:
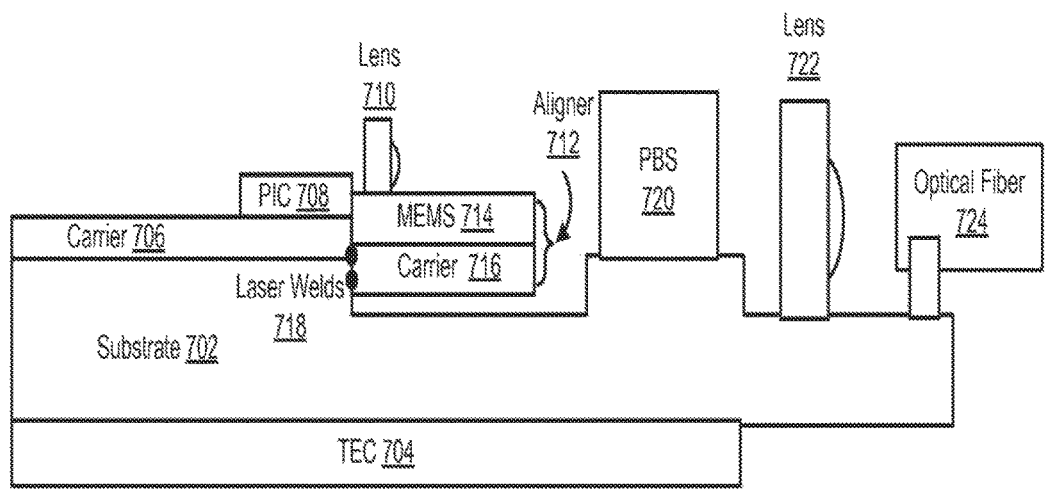
FIGS. 7A and 7B are diagrams of an example hybrid optical transmitter and/or receiver structure.
Figure 7B:
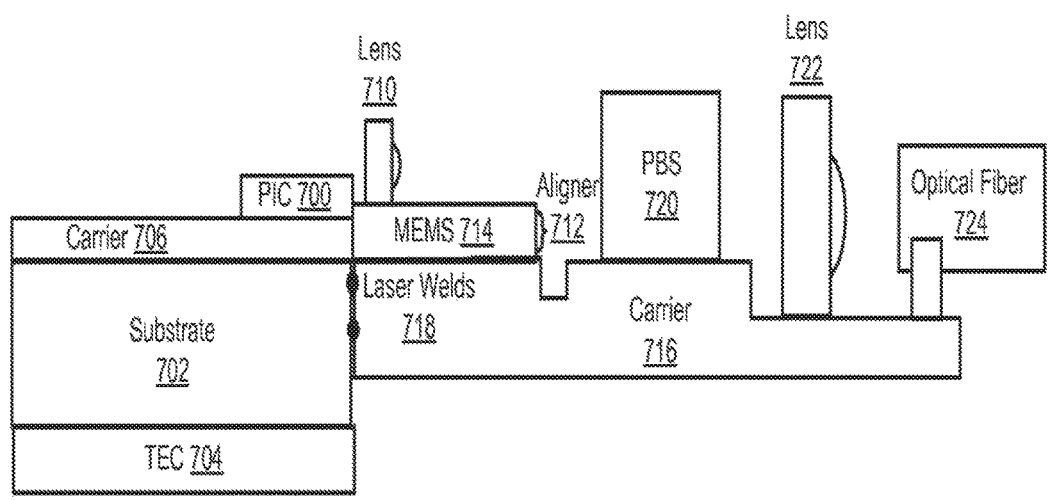

FIGS. 7A and 7B are diagrams of an example implementation 700 of a hybrid optical transmitter and/or receiver structure.

As shown in FIG. 7A, in a partial cross-sectional view, the hybrid optical transmitter and/or receiver structure includes a substrate 702 (e.g., a laser weld platform (LWP) substrate) mounted onto a TEC 704, which provides thermal control for substrate 702 and/or components thereof. Carrier 706 is mounted onto substrate 702 and includes PIC 708 (e.g., which may include a laser 106 and/or a photodiode 108). Lens 710 may receive an optical signal from PIC 708 and/or direct a signal to PIC 708. Lens 710 is mounted to an aligner 712 which includes MEMS 714 and carrier 716 (e.g., a Kovar® based carrier). Aligner 712 is mounted to substrate 702 and carrier 706 via a set of laser welds 718. Lens 710 may direct an optical signal to and/or receive an optical signal from PBS 720 based on being positioned by aligner 712 (e.g., MEMS 714) to optically couple PIC 708 and PBS 720. PBS 720 may process an optical signal and provide the optical signal to lens 722. In another example, PBS 720 may receive the optical signal from lens 722 for processing, and may provide the optical signal to lens 710. Lens 722 may direct the optical signal to optical fiber 724 (e.g., an SMF optical fiber). In another example, lens 722 may receive an optical signal from optical fiber 724, and may direct the optical signal to PBS 720.

As shown in FIG. 7B, in a partial cross sectional view, a carrier 716 (e.g., a Kovar® based carrier or another material based carrier) is welded to substrate 702 by a set of laser welds 718. In this configuration, PBS 720, lens 722, and optical fiber 724 are mounted onto carrier 716. In another example, carrier 716 may be epoxied to substrate 702, soldered to substrate 702, or the like.

In some implementations, one or more devices of FIGS. 7A and 7B may correspond to another one or more devices of FIGS. 1A-1E. For example, substrate 702 may correspond to substrate 102 of FIGS. 1A-1E; TEC 704 may correspond to TEC 124 of FIGS. 1C and 1D; carrier 706 or 716 may correspond to carrier 120 of FIGS. 1B-1D; PIC 708 may correspond to PIC 122 of FIGS. 1B-1D; lens 710 or 722 may correspond to lens 112 of FIGS. 1A-1E; aligner 712 or MEMS 714 may correspond to MEMS 110 of FIGS. 1A-1E; and/or optical fiber 724 may correspond to optical fibers 118 of FIGS. 1A-1E.

As indicated above, FIGS. 7A and 7B are provided merely as examples. Other examples are possible and may differ from what was described with regard to FIGS. 7A and 7B.

Figure 8A:
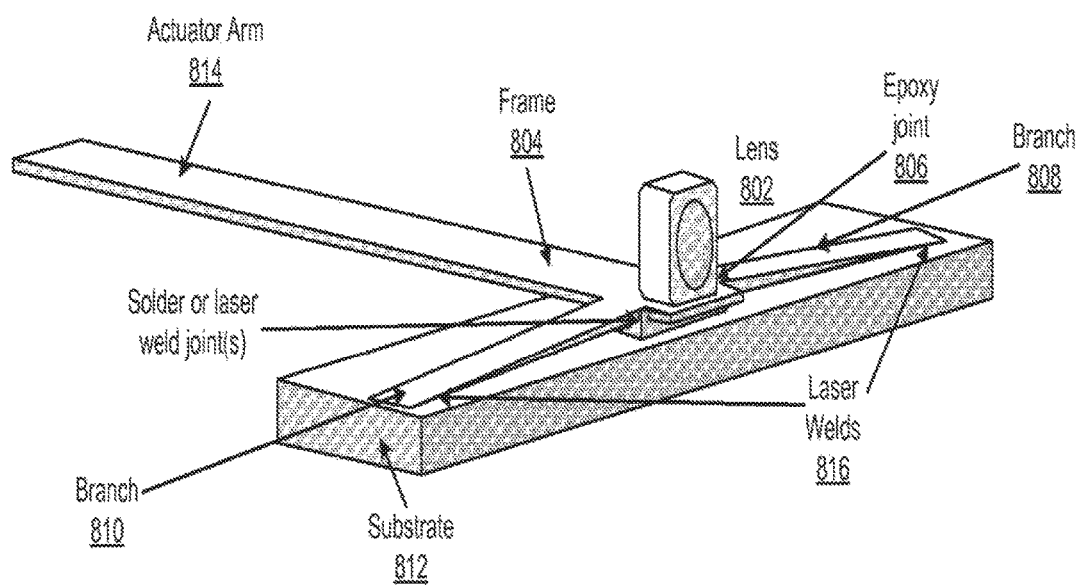
FIGS. 8A and 8B are diagrams of an example T-shaped aligner of a hybrid optical transmitter and/or receiver structure shown in FIGS. 1A-1E, FIG. 2, FIGS. 4A-4C, FIGS. 5A-5C, FIGS. 6A-6C, and/or FIGS. 7A and 7B.
Figure 8B:
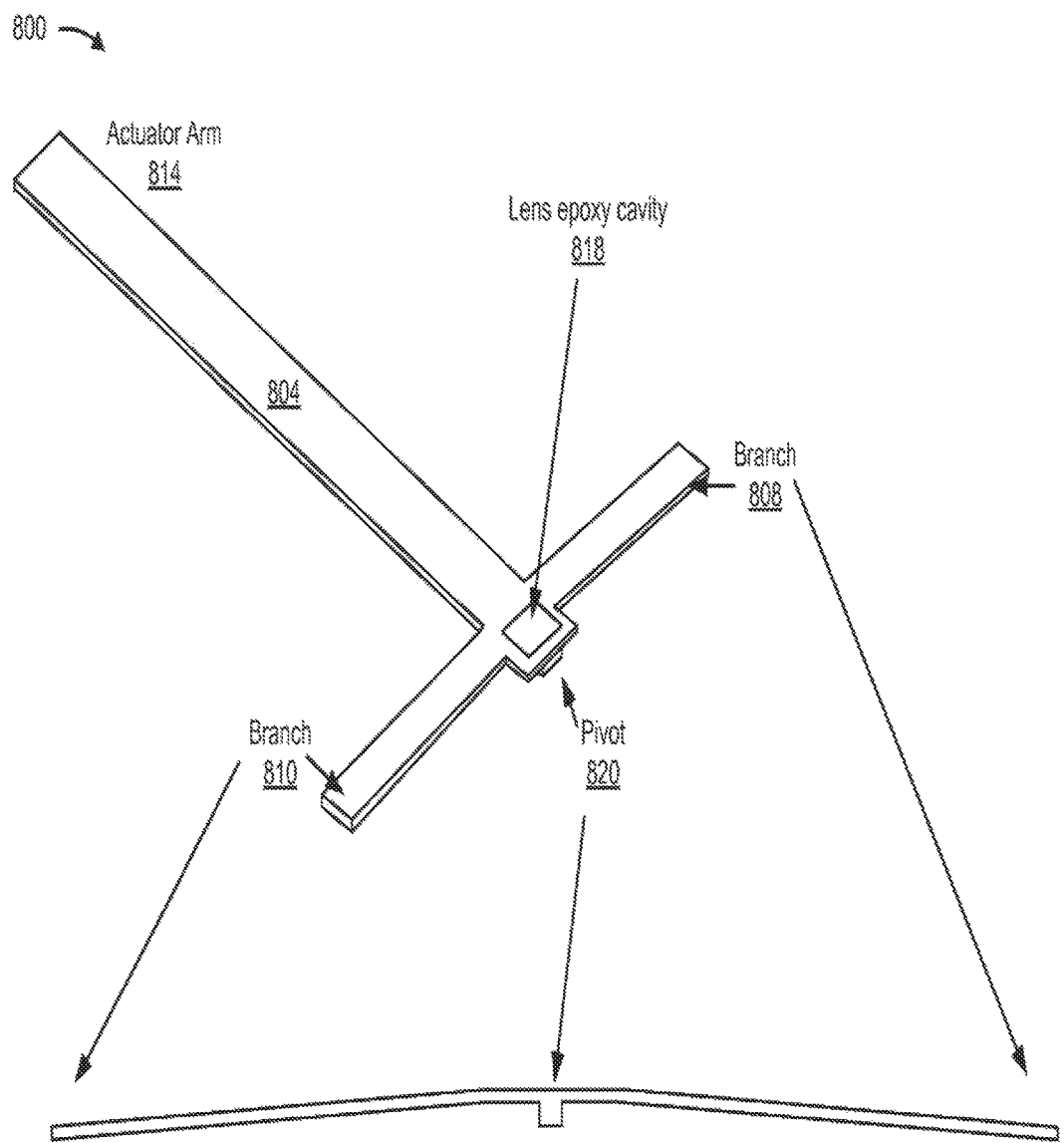

FIGS. 8A and 8B are diagrams of an example implementation 800. FIGS. 8A and 8B show an example of a T-shaped aligner of a hybrid optical transmitter and/or receiver structure shown in FIGS. 1A-1E, FIG. 2, FIGS. 4A-4C, FIGS. 5A-5C, FIGS. 6A-6C, and/or FIGS. 7A and 7B.

As shown in FIG. 8A, a lens 802 may be mounted to a frame 804 (e.g., a Kovar® frame) at epoxy joint 806. In some implementations, lens 802 may be positioned on frame 804 at a lens attachment portion of frame 804 using a passive alignment technique (e.g., where lens 802 is aligned with a PIC and/or an FSO to optically couple the PIC and the FSO without light being output from the PIC or the FSO), an active alignment technique (e.g., where light is output from a PIC and/or an FSO and monitored when passing through lens 802 to optically couple the PIC and the FSO), or the like. Additionally, or alternatively, lens 802 may be positioned on frame 804 using a robotic vision system, a pick and place machine, or the like. In some implementations, lens 802 may attach to frame 804 via another type of attachment, such as a weld attachment, a solder attachment, or the like. Thereafter, further adjustment of lens 802 may be performed using a plastic deformation technique, a piezoelectric actuation technique, a thermal actuation technique, and/or re-welding, resoldering, re-epoxying, or the like.

Frame 804 may include a first branch 808, a second branch 810, and an actuator arm 814 orthogonal to first branch 808 and second branch 810 that facilitate positioning and alignment of lens 802. Frame 804 may be in an approximately T-shaped form, cross-shaped form, or the like, which may facilitate motion along multiple axes based on actuating an approximate end of first branch 808, second branch 810, and/or actuator arm 814. As an example, the T-shaped aligner may facilitate a first degree of freedom of movement (e.g., along a first axis of rotation) based on actuating actuator arm 814 and a second degree of freedom of movement (e.g., along a second axis of rotation) based on actuating at least one of first branch 808 or second branch 810. In some implementations, actuating at least one of first branch 808, second branch 810, or actuator arm 814 may provide a third degree of freedom of movement (e.g., along a third axis of rotation). Based on actuating first branch 808, second branch 810, and/or actuator arm 814 (e.g., via piezoelectric actuation, thermal actuation, or the like), lens 802 may be positioned and/or oriented to optically couple a first optical device and a second optical device. First branch 808 and second branch 810 may be mounted onto substrate 812 via laser welds 816.

As shown in FIG. 8B, in a projection view and a partial cross-sectional view, frame 804 may include a lens epoxy cavity into which epoxy may be positioned when attaching lens 802 to frame 804. A pivot 820 may be positioned under frame 804 and approximately under lens epoxy cavity 818. Pivot 820 may facilitate a mechanical advantage when actuating branch 808, branch 810, and/or actuator arm 814. For example, a quantity of movement of lens 802 when actuating actuator arm 814, may be proportional to a first distance from lens 802 to pivot 820 divided by a second distance from lens 802 to an end of actuator arm 814. Similarly, a quantity of movement of lens 802 when actuating branch 810, may be proportional to the first distance from lens 802 to pivot 820 divided by a second distance from lens 802 to branch 810. A greater ratio of the second distance to the first distance corresponds to a smaller movement of lens 802 per unit movement of an actuating end relative to a lesser ratio, thereby facilitating finer control of lens 802 relative to a mount that does not provide such a mechanical advantage.

In some implementations, the T-shaped aligner may provide additional stability relative to another aligner, lessened difficult in mounting and maintaining an attachment relative to another aligner, or the like.

In some implementations, one or more devices of FIGS. 8A and 8B may correspond to another one or more devices of FIGS. 1A-1E. For example, substrate 812 may correspond to substrate 102 of FIGS. 1A-1E; lens 802 may correspond to lens 112 of FIGS. 1A-1E; and/or the T-shaped aligner may correspond to MEMS 110 of FIGS. 1A-1E.

As indicated above, FIGS. 8A and 8B are provided merely as an example. Other examples are possible and may differ from what was described with regard to FIGS. 8A and 8B.

In this way, a hybrid optical transmitter and/or receiver structure may facilitate optical coupling of two or more optical devices via a MEMS and lens assembly.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software, unless stated otherwise, such as with regard to a transverse magnetic component and a transverse electric component of an optical signal.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a substrate;
a carrier mounted to the substrate;
a transmitter photonic integrated circuit (PIC) mounted on the carrier,
   the transmitter PIC including a plurality of lasers that generate an optical signal when a voltage or current is applied to one of the plurality of lasers;
a first microelectromechanical structure (MEMS) mounted to the substrate,
   the first MEMS including a first set of lenses;
a planar lightwave circuit (PLC) mounted to the substrate,
   the PLC being optically coupled to the plurality of lasers by the first set of lenses of the first MEMS; and
a second MEMS mounted to the substrate,
   the second MEMS including a second set of lenses,
   the second set of lenses being configured to optically couple the PLC to an optical fiber.

2. The device of claim 1, further comprising:
a receiver PIC mounted on the carrier,
   the receiver PIC including a plurality of photodetectors optically coupled to the PLC by the first MEMS.

3. The device of claim 1, where the substrate is a nickel-cobalt ferrous alloy based substrate.

4. The device of claim 1, where the PLC includes at least one of:
a rotator,
a polarization beam splitter,
a polarization beam combiner,
a multiplexer, or
a demultiplexer.

5. The device of claim 1, further comprising:
an actuator,
   the actuator being associated with the first MEMS,
   the actuator being configured to position the first set of lenses to cause the first set of lenses to optically couple the plurality of lasers to the PLC.

6. The device of claim 1, further comprising:
an optical source assembly that includes the plurality of lasers,
   the plurality of lasers being tunable by a control signal received by the optical source assembly; and
an optical feedback assembly,
   the optical feedback assembly receiving the optical signal from the plurality of lasers and being associated with generating the control signal, based on the optical signal, for the optical source assembly.

7. The device of claim 1, further comprising:
a thermo-electric cooler (TEC),
   the TEC being configured to cause an adjustment to a temperature of a portion of the device.

* * * * *